United States Patent
Lin

(10) Patent No.: US 7,739,074 B2
(45) Date of Patent: Jun. 15, 2010

(54) METHOD OF RECOGNIZING AND TRACKING A SPATIAL POINT

(75) Inventor: Ming-Yen Lin, 9F., No. 19, Lane 204, Songshan Rd., Sinyi District, Taipei (TW)

(73) Assignee: Ming-Yen Lin, Taipei (TW)

(*) Notice: Subject to any disclaimer, the term of this patent is extended or adjusted under 35 U.S.C. 154(b) by 190 days.

(21) Appl. No.: 12/047,159

(22) Filed: Mar. 12, 2008

(65) Prior Publication Data

US 2008/0228438 A1     Sep. 18, 2008

(30) Foreign Application Priority Data

Mar. 14, 2007   (TW) ............................... 96108692 A

(51) Int. Cl.
*G06F 15/00* (2006.01)
*G01B 11/00* (2006.01)
(52) U.S. Cl. .................. 702/152; 356/614; 382/103
(58) Field of Classification Search ............... 702/150, 702/152, 153; 356/614; 382/103
See application file for complete search history.

(56) References Cited

U.S. PATENT DOCUMENTS

2008/0259355 A1* 10/2008 Lin ............................. 356/614

* cited by examiner

Primary Examiner—Bryan Bui
(74) Attorney, Agent, or Firm—WPAT., P.C.; Justin King

(57) ABSTRACT

The present invention relates to a method of recognizing and tracking a spatial point, and more particularly to a method of using a point light source and a spatial point recognition device to measure the coordinates of the point light source and the coordinates of the convergent point of the spatial point recognition device based on the principle of parallax of human eyes, as to achieve the purpose of recognizing the position of a spatial point. Further, the spatial point recognition device is capable of moving the convergent point, such that the coordinates of the convergent point are superimposed onto the coordinates of the point light source, so as to achieve the purpose of tracking a spatial point automatically. At the same time, the spatial point recognition device can also receive the coordinates of a new convergent point to reset the position of the convergent point, so as to achieve the purpose of resetting the convergent point.

20 Claims, 28 Drawing Sheets

METHOD OF RECOGNIZING AND TRACKING A SPATIAL POINT

CROSS REFERENCE TO RELATED PATENT APPLICATION

This patent application is based on Taiwan, R.O.C. patent application No. 096108692 filed on Mar. 14, 2007.

FIELD OF THE INVENTION

The present invention relates to a method of recognizing and tracking a spatial point, and more particularly to a method of using a point light source and a spatial point recognition device to measure the coordinates of the point light source and the coordinates of the convergent point of the spatial point recognition device based on the principle of parallax of human eyes, as to achieve the purpose of recognizing the position of a spatial point. Further, the spatial point recognition device is capable of moving the convergent point, such that the coordinates of the convergent point are superimposed onto the coordinates of the point light source, so as to achieve the purpose of tracking a spatial point automatically. At the same time, the spatial point recognition device can also receive the coordinates of a new convergent point to reset the position of the convergent point, so as to achieve the purpose of resetting the convergent point.

BACKGROUND OF THE INVENTION

FIG. 1 shows a schematic view of imaging of a 2D optical lens.

A general 2D optical lens is formed by a spherical lens 1. After an object point o of a paraxial point light source goes through a 2D optical lens 1, a characteristic of the image includes a point-shaped image point $i_{xy}$, and the relation of its image position follows the principle of geometric optics as shown in Equation (1) as listed below.

$$\frac{1}{l_o} + \frac{1}{l_i} = \frac{1}{f} \quad (1)$$

where, $l_o$ is an object distance of the point light source o, and $l_i$ is an image distance, and f is a focal length of the optical lens 1. In addition, another characteristic of the geometric optical image resides on that a non-deviated light exists between the point light source o and the image point $i_{xy}$, and the light passes through a geometric center $O_{lens}$ of the 2D optical lens 1.

FIG. 2 is a schematic view of forming an image by a 1D optical lens.

A general 1D optical lens is formed by semi-cylindrical lenses 2, 3, and its imaging principle follows the theory of geometric optics, but the 1D optical lens has the 1D imaging ability only. Therefore, 1D longitudinal focusing optical lens 2 transforms a point light source into a transverse line image $i_y$, and a 1D transverse focusing optical lens 3 transforms a point light source into a longitudinal line image $i_x$, and the image transformation also follows the principle of geometric optics as listed in Equation (1).

FIG. 3 is a schematic view of a general optical camera. The camera 5 can be a general optical camera, a digital camera, or a camcorder, comprising an adjustable aperture 6, a variable focusing lens module 7, an image sensing and recording device 8. For the object point $o_1$, an appropriate adjustment of the focal length f of the variable focusing lens module 7 is made to obtain an image point $i_1$, and form an image on the image recording device 8. In general, a relation of $l_i \approx f$ can be obtained due to the object distance $l_o$ being larger than the focal length f.

For an object point $o_2$ at a different distance, the variable focusing lens module 7 is used for obtaining another image point $i_2$. By an appropriate adjustment of the size of the adjustable aperture 6, another similar image point $i_2$ can be obtained on the image recording device 8.

FIG. 4(a) is a schematic view of a structure of a human eyeball.

Human eyeball 10 is similar to an optical camera, and mainly comprises an iris 11, an eye crystalline lens 13 and a retina 15. Compared with the optical camera, the function of the iris 11 is to adjust the size of the pupil 12 and can be considered as an adjustable aperture; the eye crystalline lens 13 serves as a lens, such that the ciliaris muscle 14 can be moved to change the curvature (or focal length) of the eye crystalline lens 13, and thus can be considered as a variable focusing lens; and the retina 15 can be considered as an image sensor for transmitting an obtained image to a brain through the optic nerve 16, and the brain processes, stores and recognizes the visual space. In general, the viewing direction of the eyeball 10 (or known as the visual axis 17, which is the optical axis of the optical system of the eyeball) bases on the up-and-down and left-and-right movements of the eyeball 10 to change the direction of the visual axis 17 in a limited extent. Further, the left-and-right and up-and-down rotation of the neck can change the direction of the visual axis 17 is a great extent.

FIG. 4(b) is a schematic view of a structure of a visual space.

As to the left and right eyes 21, 22, the visual space refers to the space existed and observed by the left and right eyes 21, 22. Firstly, a world coordinate system O(X, Y, Z) is defined, such that $\hat{i}, \hat{j}, \hat{k}$ are unit vectors of the coordinate axes in the coordinate system. The coordinate axes of the world coordinate system are fixed, and the world coordinate system constitutes the space to define the visual space. Further, another rotating but immoving neck coordinate system $O_N(X_N, Y_N, Z_N)$ is set at the origin (0, 0, 0) of the world coordinate system O(X, Y, Z) and $\hat{i}_N, \hat{j}_N, \hat{k}_N$ are set to be the unit vectors of the coordinate axes in the coordinate system, and the coordinate system $O_N(X_N, Y_N, Z_N)$ is rotated such that the axis $Z_N$ can be rotated to an angle $\Theta$ with respect to the axis $Y_N$, and the axis $X_N$ can be rotated to an angle $\Phi$ as shown in FIG. 4(c).

Further, a rotating but immoving left eye coordinate system $O_L(X_L, Y_L, Z_L)$ is set at the position (S/2, H, 0) of the neck coordinate system $O_N(X_N, Y_N, Z_N)$, and $\hat{u}_{LX}, \hat{u}_{LY}, \hat{u}_{LZ}$ are set to be the unit vectors of the coordinate axes, and a rotating but immoving right eye coordinate system $O_R(X_R, Y_R, Z_R)$ is set at the position (-S/2, H, 0) of $O_N(X_N, Y_N, Z_N)$, and $\hat{u}_{RX}, \hat{u}_{RY}, \hat{u}_{RZ}$ are set to be the unit vectors of the coordinate axes. Therefore $O_N(X_N, Y_N, Z_N)$ can be rotated to an angle of $\Theta$ or $\Phi$ to drive the rotation of $O_L(X_L, Y_L, Z_L), O_R(X_R, Y_R, Z_R)$ and the point $O_H$ respectively, and $\Theta$ and $\Phi$ can be considered as angles of left-and-right (horizontal) and up-and-down (vertical) rotations of the neck. S is defined as the stereo base; $O_H$ is defined as the center of stereo base; and the length of H is considered as the height of cervical (neck) spine as shown in FIGS. 4(f) and 4(g).

In FIG. 4(b), a point $F_L$ at the position (0, 0, f) on the left eye coordinate system $O_L(X_L, Y_L, Z_L)$ is defined as the center position of the left eye crystalline lens. The axis $Z_L$ of the coordinate system $O_L(X_L, Y_L, Z_L)$ can be rotated to an angle $\theta_L$ with respect to the axis $Y_L$, and an angle $\phi_L$ with respect to the axis $X_L$ as shown in FIG. 4(d). Therefore, the angles $\theta_L, \phi_L$ can be considered as the angles of left-and-right (horizontal) and up-and-down (vertical) rotations similar to the rotations of the left eyeball as shown in FIG. 4(f) and FIG. 4(g) respectively. Since the $O_L(X_L, Y_L, Z_L)$ of the left eye coordinate system is set on the retina, therefore the retina disposed proximate to the origin of the coordinates can be considered to be disposed on the plane $X_L$-$Y_L$, and the plane $X_L$-$Y_L$ is defined as the plane of the left image.

In FIG. 4(b), a point $F_R$ at the position (0, 0, f) on the right eye coordinate system $O_R(X_R, Y_R, Z_R)$ is defined as of the center position of the right eye crystalline lens. The axis $Z_R$ of the coordinate system $O_R(X_R, Y_R, Z_R)$ can be rotated to an angle $\theta_R$ with respect to the axis $Y_R$, and an angle of $\phi_R$ with respect to the axis the axis $X_R$ as shown in FIG. 4(e). Therefore, the angles $\theta_R$, $\phi_R$ can be considered as the angles of the rotations similar to left-and-right (horizontal) and up-and-down (vertical) rotations of the right eyeball as shown in FIGS. 4(f) and 4(g). Since the right eye coordinate system $O_R(X_R, Y_R, Z_R)$ is set on the retina therefore the retina disposed on the origin of the coordinates can be considered to be disposed on the plane $X_R$-$Y_R$, and thus the plan $X_R$-$Y_R$ is defined as the plant of the right image.

FIG. 4(h) is a schematic geometric view of a (convergent point), an object point and each coordinate when two eyes are staring at a point. If two eyes are staring at a point in the front, the visual axes of two eyes are intersected at a point which is called a point of view or convergent point V. In other words, the axes $Z_L$, $Z_R$ are the visual axes of the left and right eyes 21, 22 respectively, and the two visual axes must be intersected at a point which is the convergent point V. In a world coordinate system O(X, Y, Z), the coordinates of the convergent point V are $(X_V, Y_V, Z_V)$. In the neighborhood of the convergent point V, there is an object point P, and in the world coordinate system O(X, Y, Z), the coordinates of the object point P are $(X_P, Y_P, Z_P)$. Further, the position of a point image $I_L$ of the object point P formed by the left eye crystalline lens at the coordinate system of the left eye retina $O_L(X_L, Y_L, Z_L)$ are $I_L(x_L, y_L, 0)$; and the position of a point image $I_R$ of the object point P formed by the right eye crystalline lens at the $O_R(X_R, Y_R, Z_R)$ coordinate system of the right eye retina are $I_R(x_R, y_R, 0)$. In general, the angles $(\theta_L, \theta_R, \phi_L, \phi_R, \Theta, \Phi)$ of the visual axes of both left and right eyes are adjusted appropriately to superimpose the convergent point V with the object point P to achieve the purpose of tracking and staring at an object.

As to human eyes, the up-and-down movements of the left and right eyeballs are limited to the same angle due to the evolution of human vision to recognize the 3D space effectively. In other words, $\phi_L = \phi_R = \phi$. The condition of this limitation gives rise to a very important result which illustrates the vertical coordinate of point image $I_L$, $I_R$ on the retina is consistent. In other words, $y_L = y_R$. Another necessary condition of causing such result is that the focal length of both left and right eyes must be equal to assure the consistency of the size of an image formed at the left and right eyes. The so-called parallax phenomenon refers to the difference between both images of an object point P, other than the convergent point V, formed on the retinas of the left and right eyes. In other words, $x_L \neq x_R$. With the parallax, a human eye is capable of recognizing the distance of the space. Further, the value of a stereo base S is the most fundamental factor of determining the magnitude of the parallax. For the recognition of an object at a farther end, the parallax effect can be improved by increasing the stereo base S. As to the space recognition of a human vision, the angles $(\theta_L, \theta_R, \phi, \Theta, \Phi, S, f)$ are defined as a group of convergent parameters, and the parameters determine the parallax effect to achieve the purpose of recognizing the space.

SUMMARY OF THE INVENTION

Therefore, it is a primary objective of the present invention to overcome the shortcomings of the prior art by using the current existing prior art to achieve the effect of human eyes of recognizing the space distance. The invention provides a method of recognizing a spatial point based on the principle of parallax of human eyes to the space recognition, and uses a point light source and a spatial point recognition device to measure the coordinates of an object point of the point light source, and the coordinates of the convergent point of the spatial point recognition device to achieve the effect of recognizing the position of a spatial point light source. Further, the spatial point recognition device can move the convergent point to superimpose the coordinates of the convergent point with the coordinates of the object point to achieve the purpose of tracking the object point automatically. In the meantime, the spatial point recognition device can receive the coordinates of an external new convergent point to achieve the purpose of resetting the coordinates of a convergent point.

To make it easier for our examiner to understand the description of the present invention, we use preferred embodiments and related drawings with respective numerals to illustrate the invention.

The calculating method based on the theory of the parallax is described first, and then the preferred embodiments will be described as follows.

FIG. 5(d) is a schematic view of a geometric relation of each coordinate system, convergent point, object point and image point of a known visual axis parameters of visual axes. According to the principle of parallax, the coordinates of the convergent point $V(X_V, Y_V, Z_V)$ and the object point $P(X_P, Y_P, Z_P)$ can be calculated by using the known conditions such as the convergent parameters visual axis $(\theta_L, \theta_R, \phi, \Theta, \Phi, S, f)$ and the point image coordinates $I_L(x_L, y_L, 0)$, $I_R(x_R, y_R, 0)$ of the left and right eyes. Also, the new convergent parameters can be obtained to achieving the tracking purpose.

1. Define each coordinate system at an initial state.

FIG. 4(b) is a schematic view of a visual space at an initial state.

In the figure showing the initial geometric relation of each coordinate system, a neck coordinate system $O_N(X_N, Y_N, Z_N)$, a left eye coordinate system $O_L(X_L, Y_L, Z_L)$, and a right eye coordinate system $O_R(X_R, Y_R, Z_R)$ in the world coordinate system O(X, Y, Z) are set before the angles $\theta_L, \theta_R, \phi, \Theta, \Phi$ are rotated, and the origin of each coordinate system is defined as follows:

$$O_N = \begin{bmatrix} 0 \\ 0 \\ 0 \end{bmatrix}, O_L = \begin{bmatrix} \frac{S}{2} \\ H \\ 0 \end{bmatrix}, O_R = \begin{bmatrix} -\frac{S}{2} \\ H \\ 0 \end{bmatrix} \quad (2)$$

In addition, the unit vector of each coordinate axis of the world coordinate system O(X, Y, Z) is defined as follows:

$$\hat{i} = (1, 0, 0), \hat{j} = (0, 1, 0), \hat{k} = (0, 0, 1) \quad (3)$$

The unit vector of each coordinate axis on each coordinate system with respect to the world coordinate system O(X, Y, Z), is defined as follows:

$$\hat{i}_N = (1, 0, 0), \hat{j}_N = (0, 1, 0), \hat{k}_N = (0, 0, 1) \quad (4)$$

$$\hat{u}_{LX} = (1, 0, 0), \hat{u}_{LY} = (0, 1, 0), \hat{u}_{LZ} = (0, 0, 1) \quad (5)$$

$$\hat{u}_{RX} = (1, 0, 0), \hat{u}_{RY} = (0, 1, 0), \hat{u}_{RZ} = (0, 0, 1) \quad (6)$$

2. Rotation of the Neck Parameter $\Theta$ and $\Phi$

FIG. 5(a) shows a relative geometric relation of each coordinate system, when the neck coordinate system $O_N(X_N, Y_N, Z_N)$ rotates angle $\Theta$ about the axis $Y_N$ first. FIG. 5(b) shows a relative geometric relation of each coordinate system after the next rotation of angle $\Phi$ about the axis $X_N$. The positive and negative values of the angles $\Theta$, $\Phi$ are defined according to the right-hand rule.

Since the transformation of coordinate rotations relates to the order of rotations, therefore the angle $\Theta$ is rotated first, and then the angle $\Phi$ is rotated, and the result will be different from that obtained by rotating the angle $\Phi$ first and then the angle of $\Theta$ angle later. Therefore, the present invention includes the order of rotations of the left and right eye point image coordinates $\theta_L$, $\theta_R$, $\phi_L$, $\phi_R$, and one of the order of rotations is discussed for the purpose of illustrating the invention only, and other orders of rotations will not be described here, since their calculations are the same.

To clearly highlight the change of coordinate axes and unit vectors, the neck coordinate system is rotated to an angle of $+\Theta$ which means the neck turns to the left side during the rotation about the vertical axis. For the rotation about the horizontal axis, the neck coordinate system is rotated to an angle of $+\Phi$, which means that the neck turns downward. Therefore, the transformation of the left eye coordinate system $O_L(X_L, Y_L, Z_L)$ and the right eye coordinate system $O_R(X_R, Y_R, Z_R)$ in the world coordinate system $O(X, Y, Z)$ can be defined as follows:

$$\begin{pmatrix} X \\ Y \\ Z \end{pmatrix} = R(\Theta, \Phi) \begin{pmatrix} X''_L \\ Y''_L \\ Z''_L \end{pmatrix} + O''_L \quad (7)$$

$$\begin{pmatrix} X \\ Y \\ Z \end{pmatrix} = R(\Theta, \Phi) \begin{pmatrix} X''_R \\ Y''_R \\ Z''_R \end{pmatrix} + O''_R \quad (8)$$

where, $$R(\Theta, \Phi) = \begin{pmatrix} \cos\Theta & \sin\Theta\sin\Phi & \sin\Theta\cos\Phi \\ 0 & \cos\Phi & -\sin\Phi \\ -\sin\Theta & \cos\Theta\sin\Phi & \cos\Theta\cos\Phi \end{pmatrix} \quad (9)$$

$$O''_L = \begin{bmatrix} X''_{L0} \\ Y''_{L0} \\ Z''_{L0} \end{bmatrix} = \begin{pmatrix} H\sin\Theta\sin\Phi + \frac{S}{2}\cos\Theta \\ H\cos\Phi \\ H\cos\Theta\sin\Phi - \frac{S}{2}\sin\Theta \end{pmatrix} \quad (10)$$

$$O''_R = \begin{bmatrix} X''_{R0} \\ Y''_{R0} \\ Z''_{R0} \end{bmatrix} = \begin{pmatrix} H\sin\Theta\sin\Phi - \frac{S}{2}\cos\Theta \\ H\cos\Phi \\ H\cos\Theta\sin\Phi + \frac{S}{2}\sin\Theta \end{pmatrix} \quad (11)$$

For the world coordinate system $O(X, Y, Z)$, left eye coordinate system $O_L(X_L, Y_L, Z_L)$ and right eye coordinate system $O_R(X_R, Y_R, Z_R)$, after the neck coordinate system $O_N(X_N, Y_N, Z_N)$ is rotated through an angle $\Theta$ or $\Phi$, the unit vector of each coordinate axis is changed as follows:

$$\hat{u}''_{LX} = \hat{u}''_{RX} = R(\Theta, \Phi)\begin{bmatrix} 1 \\ 0 \\ 0 \end{bmatrix} \quad (12)$$

$$\hat{u}''_{LY} = \hat{u}''_{RY} = R(\Theta, \Phi)\begin{bmatrix} 0 \\ 1 \\ 0 \end{bmatrix} \quad (13)$$

$$\hat{u}''_{LZ} = \hat{u}''_{RZ} = R(\Theta, \Phi)\begin{bmatrix} 0 \\ 0 \\ 1 \end{bmatrix} \quad (14)$$

Equations (12) to (14) are expanded to obtain:

$$\hat{u}''_{LX} = \hat{u}''_{RX} = \cos\Theta\hat{i} - \sin\Theta\hat{k} \quad (15)$$

$$\hat{u}''_{LY} = \hat{u}''_{RY} = \sin\Theta\sin\Phi\hat{i} + \cos\Phi\hat{j} + \cos\Theta\sin\Phi\hat{k} \quad (16)$$

$$\hat{u}''_{LZ} = \hat{u}''_{RZ} = \sin\Theta\cos\Phi\hat{i} - \sin\Phi\hat{j} + \cos\Theta\cos\Phi\hat{k} \quad (17)$$

3. Rotation of Eye Parameters $\theta_L$, $\theta_R$, $\phi$

FIG. 5(c) shows a geometric variation relation of the left and right eye coordinate systems being rotated to an angle $\theta_L$, $\theta_R$, $\phi$. The positive or negative values of the angles $\theta_L$, $\theta_R$, $\phi$ of the left and right eye coordinate systems are defined by the right-hand rule. To clearly highlight the change of the coordinate axes and the unit vectors, the left eye coordinate system is rotated to an angle $\theta_L$ when the vertical axis is rotated. In this embodiment, $\theta_L<0$ which is a negative value. The right eye coordinate system is rotated to an angle $\theta_R$. In this embodiment, $\theta_R>0$ which is a positive value. In other words, both left and right eyes are staring at the front side. Further, the horizontal axis of the two are rotated to an angle $\phi$ angle. In this embodiment, $\phi<0$ which is a negative value. In other words, both left and right eyes are staring upward.

Therefore, the coordinate transformation between the left eye coordinate system $O_L(X_L, Y_L, Z_L)$ and the world coordinate system $O(X, Y, Z)$ is given below:

$$\begin{pmatrix} X \\ Y \\ Z \end{pmatrix} = R_L(\Theta, \Phi, \theta_L, \varphi) \begin{pmatrix} X''_L \\ Y''_L \\ Z''_L \end{pmatrix} + O''_L \quad (18)$$

where, $$R_L(\Theta, \Phi, \theta_L, \varphi) = \begin{pmatrix} \cos\Theta & \sin\Theta\sin\Phi & \sin\Theta\cos\Phi \\ 0 & \cos\Phi & -\sin\Phi \\ -\sin\Theta & \cos\Theta\sin\Phi & \cos\Theta\cos\Phi \end{pmatrix} \quad (19)$$

$$\begin{pmatrix} \cos\theta_L & \sin\theta_L\sin\varphi & \sin\theta_L\cos\varphi \\ 0 & \cos\varphi & -\sin\varphi \\ -\sin\theta_L & \cos\theta_L\sin\varphi & \cos\theta_L\cos\varphi \end{pmatrix}$$

The matrix is simplified to obtain:

$$R_L(\Theta, \Phi, \theta_L, \varphi) = \begin{pmatrix} R_{L11} & R_{L12} & R_{L13} \\ R_{L21} & R_{L22} & R_{L22} \\ R_{L31} & R_{L32} & R_{L33} \end{pmatrix} \quad (20)$$

Equation (19) is expanded and substituted into Equation (20) to obtain:

$$R_{L11} = \cos\Theta \cos\theta_L - \sin\Theta \cos\Phi \sin\theta_L \quad (21)$$

$$R_{L12} = \cos\Theta \sin\theta_L \sin\varphi + \sin\Theta \sin\Phi \cos\varphi + \sin\Theta \cos\Phi \cos\theta_L \sin\varphi \quad (22)$$

$$R_{L13} = \cos\Theta \sin\theta_L \cos\varphi - \sin\Theta \sin\Phi \sin\varphi + \sin\Theta \cos\Phi \cos\theta_L \cos\varphi \quad (23)$$

$$R_{L21} = \sin\Phi \sin\theta_L \quad (24)$$

$$R_{L22} = \cos\Phi \cos\varphi - \sin\Phi \cos\theta_L \sin\varphi \quad (25)$$

$$R_{L23} = -\cos\Phi \sin\varphi - \sin\Phi \cos\theta_L \cos\varphi \quad (26)$$

$$R_{L31} = -\sin\Theta \cos\theta_L - \cos\Theta \cos\Phi \sin\theta_L \quad (27)$$

$$R_{L32} = -\sin\Theta \sin\theta_L \sin\varphi + \cos\Theta \sin\Phi \cos\varphi + \cos\Theta \cos\Phi \cos\theta_L \sin\varphi \quad (28)$$

$$R_{L33} = \sin\Theta \sin\theta_L \cos\varphi - \cos\Theta \sin\Phi \sin\varphi + \cos\Theta \cos\Phi \cos\theta_L \cos\varphi \quad (29)$$

Further, the coordinate transformation between the right eye coordinate system $O_R(X_R, Y_R, Z_R)$ and the world coordinate system $O(X, Y, Z)$ is given below:

$$\begin{pmatrix} X \\ Y \\ Z \end{pmatrix} = R_R(\Theta, \Phi, \theta_R, \varphi) \begin{pmatrix} X_R''' \\ Y_R''' \\ Z_R''' \end{pmatrix} + O_R'' \quad (30)$$

where, $$R_R(\Theta, \Phi, \theta_R, \varphi) = \begin{pmatrix} \cos\Theta & \sin\Theta \sin\Phi & \sin\Theta \cos\Phi \\ 0 & \cos\Phi & -\sin\Phi \\ -\sin\Theta & \cos\Theta \sin\Phi & \cos\Theta \cos\Phi \end{pmatrix} \begin{pmatrix} \cos\theta_R & \sin\theta_R \sin\varphi & \sin\theta_R \cos\varphi \\ 0 & \cos\varphi & -\sin\varphi \\ -\sin\theta_R & \cos\theta_R \sin\varphi & \cos\theta_R \cos\varphi \end{pmatrix} \quad (31)$$

The matrix is simplified to obtain:

$$R_R(\Theta, \Phi, \theta_R, \varphi) = \begin{pmatrix} R_{R11} & R_{R12} & R_{R13} \\ R_{R21} & R_{R22} & R_{R23} \\ R_{R31} & R_{R32} & R_{R33} \end{pmatrix} \quad (32)$$

Equation (31) is expanded and substituted into Equation (32) to obtain:

$$R_{R11} = \cos\Theta \cos\theta_R - \sin\Theta \cos\Phi \sin\theta_R \quad (33)$$

$$R_{R12} = \cos\Theta \sin\theta_R \sin\varphi + \sin\Theta \sin\Phi \cos\varphi + \sin\Theta \cos\Phi \cos\theta_R \sin\varphi \quad (34)$$

$$R_{R13} = \cos\Theta \sin\theta_R \cos\varphi - \sin\Theta \sin\Phi \sin\varphi + \sin\Theta \cos\Phi \cos\theta_R \cos\varphi \quad (35)$$

$$R_{R21} = \sin\Phi \sin\theta_R \quad (36)$$

$$R_{R22} = \cos\Phi \cos\varphi - \sin\Phi \cos\theta_R \sin\varphi \quad (37)$$

$$R_{R23} = -\cos\Phi \sin\varphi - \sin\Phi \cos\theta_R \cos\varphi \quad (38)$$

$$R_{R31} = -\sin\Theta \cos\theta_R - \cos\Theta \cos\Phi \sin\theta_R \quad (39)$$

$$R_{R32} = -\sin\Theta \sin\theta_R \sin\varphi + \cos\Theta \sin\Phi \cos\varphi + \cos\Theta \cos\Phi \cos\theta_R \sin\varphi \quad (40)$$

$$R_{R33} = \sin\Theta \sin\theta_R \cos\varphi - \cos\Theta \sin\Phi \sin\varphi + \cos\Theta \cos\Phi \cos\theta_R \cos\varphi \quad (41)$$

Further, the change of unit vectors of the coordinate axes of the left eye coordinate system with respect to the world coordinate system is given below:

$$\hat{u}_{LX}''' = \begin{bmatrix} u_{LXi}''' \\ u_{LXj}''' \\ u_{LXk}''' \end{bmatrix} = R_L(\Theta, \Phi, \theta_L, \varphi) \begin{bmatrix} 1 \\ 0 \\ 0 \end{bmatrix} = \begin{bmatrix} R_{L11} \\ R_{L21} \\ R_{L31} \end{bmatrix} \quad (42)$$

$$\hat{u}_{LY}''' = \begin{bmatrix} u_{LYi}''' \\ u_{LYj}''' \\ u_{LYk}''' \end{bmatrix} = R_L(\Theta, \Phi, \theta_L, \varphi) \begin{bmatrix} 0 \\ 1 \\ 0 \end{bmatrix} = \begin{bmatrix} R_{L12} \\ R_{L22} \\ R_{L32} \end{bmatrix} \quad (43)$$

$$\hat{u}_{LZ}''' = \begin{bmatrix} u_{LZi}''' \\ u_{LZj}''' \\ u_{LZk}''' \end{bmatrix} = R_L(\Theta, \Phi, \theta_L, \varphi) \begin{bmatrix} 0 \\ 0 \\ 1 \end{bmatrix} = \begin{bmatrix} R_{L13} \\ R_{L23} \\ R_{L33} \end{bmatrix} \quad (44)$$

Further, the change of unit vectors of the coordinate axes of the right eye coordinate system with respect to the world coordinate system $O(X, Y, Z)$ is given below:

$$\hat{u}_{RX}''' = \begin{bmatrix} u_{RXi}''' \\ u_{RXj}''' \\ u_{RXk}''' \end{bmatrix} = R_R(\Theta, \Phi, \theta_R, \varphi) \begin{bmatrix} 1 \\ 0 \\ 0 \end{bmatrix} = \begin{bmatrix} R_{R11} \\ R_{R21} \\ R_{R31} \end{bmatrix} \quad (45)$$

$$\hat{u}_{RY}''' = \begin{bmatrix} u_{RYi}''' \\ u_{RYj}''' \\ u_{RYk}''' \end{bmatrix} = R_R(\Theta, \Phi, \theta_R, \varphi) \begin{bmatrix} 0 \\ 1 \\ 0 \end{bmatrix} = \begin{bmatrix} R_{R12} \\ R_{R22} \\ R_{R32} \end{bmatrix} \quad (46)$$

$$\hat{u}_{RZ}''' = \begin{bmatrix} u_{RZi}''' \\ u_{RZj}''' \\ u_{RZk}''' \end{bmatrix} = R_R(\Theta, \Phi, \theta_R, \varphi) \begin{bmatrix} 0 \\ 0 \\ 1 \end{bmatrix} = \begin{bmatrix} R_{R13} \\ R_{R23} \\ R_{R33} \end{bmatrix} \quad (47)$$

4. Calculation of Convergent Point

FIG. 5(c) shows that after the left and right eye coordinate systems $O_L(X_L, Y_L, Z_L)$, $O_R(X_R, Y_R, Z_R)$ is rotated and fixed according to convergent point parameter $(\theta_L, \theta_R, \varphi, \Theta, \Phi, S)$ with respect to the world coordinate system $O(X, Y, Z)$ (wherein $\theta_L < 0$, $\theta_R > 0$ and $\varphi < 0$), and the intersection point of the left visual axis $Z'''_L$ and the right visual axis $Z'''_R$ is the convergent point $V(X_V, Y_V, Z_V)$. Therefore, the position $(X_V, Y_V, Z_V)$ of the convergent point V is determined by the convergent point parameter $(\theta_L, \theta_R, \varphi, \Theta, \Phi, S)$, and calculated as follows:

Along the left visual axis $Z''''_L$, a left convergent point vector $\overrightarrow{O''_L V''}$ parallel to the left visual axis is defined as:

$$\overrightarrow{O_L''V''} = (X - X_{L0}'', Y - Y_{L0}'', Z - Z_{L0}'') \quad (48)$$

Along the right visual axis $Z''''_R$, a right convergent point vector $\overrightarrow{O''_R V''}$ parallel to the right visual axis is defined as:

$$\overrightarrow{O_R''V''} = (X - X_{R0}'', Y - Y_{R0}'', Z - Z_{R0}'') \quad (49)$$

Since the left and right convergent point vectors $\overline{O''_L V'}$, $\overline{O''_R V''}$ are parallel to the unit vectors $\hat{u}''''_{LZ}$, $\hat{u}''''_{RZ}$ each visual axis, therefore $$\hat{u}''''_{LZ} \times \overrightarrow{O_i V} = \begin{vmatrix} \hat{i} & \hat{j} & \hat{k} \\ R_{L13} & R_{L23} & R_{L33} \\ X - X''_{L0} & Y - Y''_{L0} & Z - Z''_{L0} \end{vmatrix} = 0 \quad (50)$$

$$\hat{u}''''_{RZ} \times \overrightarrow{O_i V} = \begin{vmatrix} \hat{i} & \hat{j} & \hat{k} \\ R_{R13} & R_{R23} & R_{R33} \\ X - X''_{R0} & Y - Y''_{R0} & Z - Z''_{R0} \end{vmatrix} = 0 \quad (51)$$

Equation (50) is expanded to obtain:

$$Z = \frac{R_{L33}}{R_{L23}}(Y - Y''_{L0}) + Z''_{L0} \quad (52)$$

$$X = \frac{R_{L13}}{R_{L33}}(Z - Z''_{L0}) + X''_{L0} \quad (53)$$

$$Y = \frac{R_{L23}}{R_{L13}}(X - X''_{L0}) + Y''_{L0} \quad (54)$$

Equation (51) is expanded to obtain:

$$Z = \frac{R_{R33}}{R_{R23}}(Y - Y''_{R0}) + Z''_{R0} \quad (55)$$

$$X = \frac{R_{R13}}{R_{R33}}(Z - Z''_{R0}) + X''_{R0} \quad (56)$$

$$Y = \frac{R_{R23}}{R_{R13}}(X - X''_{R0}) + Y''_{R0} \quad (57)$$

Since the left and right visual axes are intersected at the convergent point $V(X_V, X_V, Z_V)$, Equations (52) to (54) and Equations (55) to (57) have a common solution $X=X_V; Y=Y_V; Z=Z_V$.

Since Equation (52)=Equation (55), therefore $$Y_V = \frac{\frac{R_{L33}}{R_{L23}}}{\frac{R_{L33}}{R_{L23}} - \frac{R_{R33}}{R_{R23}}} Y''_{L0} - \frac{\frac{R_{R33}}{R_{R23}}}{\frac{R_{L33}}{R_{L23}} - \frac{R_{R33}}{R_{R23}}} Y''_{R0} + \frac{Z''_{R0} - Z''_{L0}}{\frac{R_{L33}}{R_{L23}} - \frac{R_{R33}}{R_{R23}}} \quad (58)$$

Since Equation (53)=Equation (56), therefore $$Z_V = \frac{\frac{R_{L13}}{R_{L33}}}{\frac{R_{L13}}{R_{L33}} - \frac{R_{R13}}{R_{R33}}} Z''_{L0} - \frac{\frac{R_{R13}}{R_{R33}}}{\frac{R_{L13}}{R_{L33}} - \frac{R_{R13}}{R_{R33}}} Z''_{R0} + \frac{X''_{R0} - X''_{L0}}{\frac{R_{L13}}{R_{L33}} - \frac{R_{R13}}{R_{R33}}} \quad (59)$$

Since Equation (54)=Equation (57)

$$X_V = \frac{\frac{R_{L23}}{R_{L13}}}{\frac{R_{L23}}{R_{L13}} - \frac{R_{R23}}{R_{R13}}} X''_{L0} - \frac{\frac{R_{R23}}{R_{R13}}}{\frac{R_{L23}}{R_{L13}} - \frac{R_{R23}}{R_{R13}}} X''_{R0} + \frac{Y''_{R0} - Y''_{L0}}{\frac{R_{L23}}{R_{L13}} - \frac{R_{R23}}{R_{R13}}} \quad (60)$$

Further a central visual axis vector $\overline{O''_H V}$ is defined, and its angle is defined below:

$$\theta_M = \cos^{-1}\left( \frac{\overrightarrow{O''_n V} - (\overrightarrow{O''_n V} g \hat{j}''_N)\hat{j}''_N}{\|\overrightarrow{O''_n V} - (\overrightarrow{O''_n V} g \hat{j}''_N)\hat{j}''_N\|} \hat{i}''_N \right) - \frac{\pi}{2} \quad (61)$$

Further the visual axis convergence angle is defined below:

$$\theta_c = \theta_R - \theta_L \quad (62)$$

When two eyes are staring at the right front, the following geometric relations exist:

$$\theta_M = 0; \ -\theta_L = \theta_R = \theta_0 > 0; \ \theta_C = 2\theta_R = 2\theta_0 \quad (63)$$

5. Calculation of Object Point

In FIG. 5(d), an object point $P(X_P, Y_P, Z_P)$ exists in the neighborhood of the convergent point $V(X_V, Y_V, Z_V)$. Let the imaging positions of the object point on the left right eye coordinate system be the left point image $I_L(x_L, y_i, 0)$ and the right point image $I_R(x_R, y_i, 0)$ respectively, and thus the position $(X_P, Y_P, Z_P)$ of the object point P can be determined by the convergent point parameter $(\theta_L, \theta_R, \phi, \Theta, \Phi, S, f)$ and the image position $(x_L, x_R, y_i)$, and calculated as follows:

According to the coordinate transformation in Equations (10) and (18), the coordinates of the left point image on the world coordinate system can be obtained as follows:

$$I_L = \begin{bmatrix} X_{IL} \\ Y_{IL} \\ Z_{IL} \end{bmatrix} = R_L(\Theta, \Phi, \theta_L, \varphi) \begin{bmatrix} x_L \\ y_i \\ 0 \end{bmatrix} + \begin{bmatrix} X''_{L0} \\ Y''_{L0} \\ Z''_{L0} \end{bmatrix} \quad (64)$$

The coordinate transformation of Equations (11) and (30) can be used for calculating the coordinates of the right point image on the world coordinate system as follows:

$$I_R = \begin{bmatrix} X_{IR} \\ Y_{IR} \\ Z_{IR} \end{bmatrix} = R_R(\Theta, \Phi, \theta_R, \varphi) \begin{bmatrix} x_L \\ y_i \\ 0 \end{bmatrix} + \begin{bmatrix} X''_{R0} \\ Y''_{R0} \\ Z''_{R0} \end{bmatrix} \quad (65)$$

where, $Y_{IL} = Y_{IR}$

Let the coordinates of the center $F_L$, $F_R$ of the left right eye crystalline lens on the left right eye coordinate system be $(0, 0, f)$, and the coordinates of $F_L$, $F_R$ on the world coordinate system are given below:

$$F_L = \begin{bmatrix} X_{FL} \\ Y_{FL} \\ Z_{FL} \end{bmatrix} = R_L(\Theta, \Phi, \theta_L, \varphi) \begin{bmatrix} 0 \\ 0 \\ f \end{bmatrix} + \begin{bmatrix} X''_{L0} \\ Y''_{L0} \\ Z''_{L0} \end{bmatrix} \quad (66)$$

$$F_R = \begin{bmatrix} X_{FR} \\ Y_{FR} \\ Z_{FR} \end{bmatrix} = R_R(\Theta, \Phi, \theta_R, \varphi) \begin{bmatrix} 0 \\ 0 \\ f \end{bmatrix} + \begin{bmatrix} X''_{R0} \\ Y''_{R0} \\ Z''_{R0} \end{bmatrix} \quad (67)$$

The world coordinates $(X_P, Y_P, Z_P)$ of the object point P is calculated by utilizing the properties of linear geometric optics of the object point P, the center $F_L$, $F_R$ of the left right eye crystalline lens, and the left right point image $I_L$, $I_R$ as follows:

Equation (66) subtracts Equation (64) to obtain the left point image vector $\overline{I_L F_L}$ as follows:

$$\overrightarrow{I_L F_L} = R_L(\Theta, \Phi, \theta_L, \varphi) \begin{bmatrix} -x_L \\ -y_i \\ f \end{bmatrix} = \begin{bmatrix} -R_{L11}x_L - R_{L12}y_i + fR_{L13} \\ -R_{L21}x_L - R_{L22}y_i + fR_{L23} \\ -R_{L31}x_L - R_{L32}y_i + fR_{L33} \end{bmatrix} \quad (68)$$

Along the direction $\overline{F_L P}$, a left object point vector $\overline{F_L P'''}$ parallel to $\overline{F_L P}$ is defined as follows:

$$\overline{F_L P'''} = \begin{bmatrix} X \\ Y \\ R \end{bmatrix} - R_L(\Theta, \Phi, \theta_L, \varphi) \begin{bmatrix} 0 \\ 0 \\ f \end{bmatrix} - \begin{bmatrix} X''_{L0} \\ Y''_{L0} \\ Z''_{L0} \end{bmatrix} \quad (69)$$

$$= \begin{bmatrix} X - fR_{L13} - X''_{L0} \\ Y - fR_{L23} - Y''_{L0} \\ Z - fR_{L33} - Z''_{L0} \end{bmatrix}$$

Since the image is limited by the linear geometric optics, the left point image vector $\overline{I_L F_L}$ and the left object point vector $\overline{F_L P'''}$ must be in the same direction, and $$\overline{I_L F_L} \times \overline{F_L P'''} =$$

$$\overline{I_L F_L} \times \overline{F_L P'''} = \begin{bmatrix} \hat{i} & \hat{j} & \hat{k} \\ -R_{L11}x_L - R_{L12}y_i + fR_{L13} & -R_{L21}x_L - R_{L22}y_i + fR_{L23} & -R_{L31}x_L - R_{L32}y_i + fR_{L33} \\ X - fR_{L13} - X''_{L0} & Y - fR_{L23} - Y''_{L0} & Z - fR_{L33} - Z''_{L0} \end{bmatrix} \quad (70)$$

$$= 0$$

Each component of the three axes is zero after equation (70) is expanded, and thus obtaining following three equations:

$$Z = \frac{-R_{L31}x_L - R_{L32}y_i + fR_{L33}}{-R_{L21}x_L - R_{L22}y_i + fR_{L23}}(Y - fR_{L23} - Y''_{L0}) + fR_{L33} + Z''_{L0} \quad (71)$$

$$X = \frac{-R_{L11}x_L - R_{L12}y_i + fR_{L13}}{-R_{L31}x_L - R_{L32}y_i + fR_{L33}}(Z - fR_{L33} - Z''_{L0}) + fR_{L13} + X''_{L0} \quad (72)$$

$$Y = \frac{-R_{L21}x_L - R_{L22}y_i + fR_{L23}}{-R_{L11}x_L - R_{L12}y_i + fR_{L13}}(X - fR_{L13} - X''_{L0}) + fR_{L23} + Y''_{L0} \quad (73)$$

Further equation (67) subtracts Equation (65) to obtain a right image point vector $\overline{I_R F_R}$ as follows:

$$\overline{I_R F_R} = R_R(\Theta, \Phi, \theta_R, \varphi) \begin{bmatrix} -x_R \\ -y_i \\ f \end{bmatrix} = \begin{bmatrix} -R_{R11}x_R - R_{R12}y_i + fR_{R13} \\ -R_{R21}x_R - R_{R22}y_i + fR_{R23} \\ -R_{R31}x_R - R_{R32}y_i + fR_{R33} \end{bmatrix} \quad (74)$$

Along the direction of $\overline{F_R P}$, a right object point vector $\overline{F_R P'''}$ parallel to $\overline{F_R P}$ is defined as follows:

$$\overline{F_R P'''} = \begin{bmatrix} X \\ Y \\ Z \end{bmatrix} - R_R(\Theta, \Phi, \theta_R, \varphi) \begin{bmatrix} 0 \\ 0 \\ f \end{bmatrix} - \begin{bmatrix} X''_{R0} \\ Y''_{R0} \\ Z''_{R0} \end{bmatrix} \quad (75)$$

$$= \begin{bmatrix} X - fR_{R13} - X''_{R0} \\ Y - fR_{R23} - Y''_{R0} \\ Z - fR_{R33} - Z''_{R0} \end{bmatrix}$$

Since the image is limited by the linear geometric optics, the right point image vector $\overline{I_R F_R}$ and the right object point vector $\overline{F_R P'''}$ must be in the same direction, and $$\overline{I_R F_R} \times \overline{F_R P'''} = \begin{bmatrix} \hat{i} & \hat{j} & \hat{k} \\ -R_{R11}x_R - R_{R12}y_i + fR_{R13} & -R_{R21}x_R - R_{R22}y_i + fR_{R23} & -R_{R31}x_R - R_{R32}y_i + fR_{R33} \\ X - fR_{R13} - X''_{R0} & Y - fR_{R23} - Y''_{R0} & Z - fR_{R33} - Z''_{LR0} \end{bmatrix} \quad (76)$$

$$= 0$$

Each component of the three axes is zero after equation (76) is expanded, and thus obtaining following three equations:

$$Z = \frac{-R_{R31}x_R - R_{R32}y_i + fR_{R33}}{-R_{R21}x_R - R_{R22}y_i + fR_{R23}}(Y - fR_{R23} - Y''_{R0}) + fR_{R33} + Z''_{R0} \quad (77)$$

$$X = \frac{-R_{R11}x_R - R_{R12}y_i + fR_{R13}}{-R_{R31}x_R - R_{R32}y_i + fR_{R33}}(Z - fR_{R33} - Z''_{R0}) + fR_{R13} + X''_{R0} \quad (78)$$

$$Y = \frac{-R_{R21}x_R - R_{R22}y_i + fR_{R23}}{-R_{R11}x_R - R_{R12}y_i + fR_{R13}}(X - fR_{R13} - X''_{R0}) + fR_{R23} + Y''_{R0} \quad (79)$$

Since the left object point vector $\overline{F_L P'''}$ and the right object point vector $\overline{F_R P'''}$ are intersected at the object point $P(X_P, Y_P, Z_P)$, Equations (71)~(73) and Equations (77)~(79) have common solutions $X=X_P$; $Y=Y_P$; $Z=Z_P$.

From Equation (71)=Equation (77), we obtain $$Y_P = \frac{\dfrac{-R_{L31}x_L - R_{L32}y_i + fR_{L33}}{-R_{L21}x_L - R_{L22}y_i + fR_{L23}}(fR_{L23} + Y''_{L0})}{\dfrac{-R_{L31}x_L - R_{L32}y_i + fR_{L33}}{-R_{L21}x_L - R_{L22}y_i + fR_{L23}} - \dfrac{-R_{R31}x_R - R_{R32}y_i + fR_{R33}}{-R_{R21}x_R - R_{R22}y_i + fR_{R23}}} - $$

$$\frac{\dfrac{-R_{R31}x_R - R_{R32}y_i + fR_{R33}}{-R_{R21}x_R - R_{R22}y_i + fR_{R23}}(fR_{R23} + Y''_{R0})}{\dfrac{-R_{L31}x_L - R_{L32}y_i + fR_{L33}}{-R_{L21}x_L - R_{L22}y_i + fR_{L23}} - \dfrac{-R_{R31}x_R - R_{R32}y_i + fR_{R33}}{-R_{R21}x_R - R_{R22}y_i + fR_{R23}}} + $$

$$\frac{(fR_{R33} + Z''_{R0}) - (fR_{L33} + Z''_{L0})}{\dfrac{-R_{L31}x_L - R_{L32}y_i + fR_{L33}}{-R_{L21}x_L - R_{L22}y_i + fR_{L23}} - \dfrac{-R_{R31}x_R - R_{R32}y_i + fR_{R33}}{-R_{R21}x_R - R_{R22}y_i + fR_{R23}}} \quad (80)$$

From Equation (72)=Equation (78), we obtain $$Z_p = \frac{\dfrac{-R_{L11}x_L - R_{L12}y_i + fR_{L13}}{-R_{L31}x_L - R_{L32}y_i + fR_{L33}}(fR_{L33} + Z''_{L0})}{\dfrac{-R_{L11}x_L - R_{L12}y_i + fR_{L13}}{-R_{L31}x_L - R_{L32}y_i + fR_{L33}} - \dfrac{-R_{R11}x_R - R_{R12}y_i + fR_{R13}}{-R_{R31}x_R - R_{R32}y_i + fR_{R33}}} - \quad (81)$$

-continued $$\frac{\frac{-R_{R11}x_R - R_{R12}y_i + fR_{R13}}{-R_{R31}x_R - R_{R32}y_i + fR_{R33}}(fR_{R33} + Z''_{R0})}{\frac{-R_{L11}x_L - R_{L12}y_i + fR_{L13}}{-R_{L31}x_L - R_{L32}y_i + fR_{L33}} - \frac{-R_{R11}x_R - R_{R12}y_i + fR_{R13}}{-R_{R31}x_R - R_{R32}y_i + fR_{R33}}} +$$

$$\frac{fR_{R13} + X''_{R0} - (fR_{L13} + X''_{L0})}{\frac{-R_{L11}x_L - R_{L12}y_i + fR_{L13}}{-R_{L31}x_L - R_{L32}y_i + fR_{L33}} - \frac{-R_{R11}x_R - R_{R12}y_i + fR_{R13}}{-R_{R31}x_R - R_{R32}y_i + fR_{R33}}}$$

From Equation (73)=Equation (79), we obtain $$X_p = \frac{\frac{-R_{L21}x_L - R_{L22}y_i + fR_{L23}}{-R_{L11}x_L - R_{L12}y_i + fR_{L13}}(fR_{L13} + X''_{L0})}{\frac{-R_{L21}x_L - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}} - \tag{82}$$

$$\frac{\frac{-R_{R21}x_R - R_{R22}y_i + fR_{R23}}{-R_{R11}x_R - R_{R12}y_i + fR_{R13}}(fR_{R13} + X''_{R0})}{\frac{-R_{L21}x_L - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}} +$$

$$\frac{fR_{R23} + Y''_{R0} - (fR_{L23} + Y''_{L0})}{\frac{-R_{L21}x_L - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}}$$

6. Calculation of the Tracking of an Object Point

To clearly recognize spaces and perceive the distance and position of the object point, we must move the convergence of our eyes constantly to achieve the purpose of tracking the object point. The tracking can be divided into a small-angle tracking and a large-angle tracking according to the tracking range. The small-angle tracking refers to the rotation of eyeballs for changing ($\theta_L$, $\theta_R$, $\phi$) when the object point is closer to the convergent point. In other words, a smaller change of angle is used for changing the convergent point, and moving the position of the convergent point towards the object point. The large-angle object refers to the rotations of neck and eyeballs for the object point farther from the convergent point. In other words, a proper convergent point parameter ($\Theta$, $\Phi$, $\theta_L$, $\theta_R$, $\phi$) is reset to achieve the purpose of tracking the object point. In general, we usually adjust the angle of our eyeballs and neck at the same time unconsciously. In other words, ($\Theta$, $\Phi$, $\theta_L$, $\theta_R$, $\phi$) keeps the convergent point at the most attentive object point all the time to achieve the purpose of perceiving the distance and position of the object point.

Calculation of Small-Angle Tracking

FIG. 5(e) shows a schematic view of small-angle tracking.

As described before, changing the angle ($\theta_L$, $\theta_R$, $\phi$) of the eyeballs or rotating the visual axes of the left and right eyes is the way to achieve the purpose of small-angle tracking when an object point that is closer to the convergent point, so that the difference between the direction $\hat{u}_{LZ}^{new}$, $\hat{u}_{RZ}^{new}$ of the new visual axes of the left and right eyes and the direction $\hat{u}''_{LZ}$, $\hat{u}''_{RZ}$ of the original visual axes can be used for finding the change of angle $\Delta\theta_L$, $\Delta\theta_R$, $\Delta\phi$ required for the small-angle tracking visual axis.

Firstly, the unit vectors $\hat{u}_{LZ}^{new}$, $\hat{u}_{RZ}^{new}$ of the new visual axes of the left and right eyes are calculated as follows:

$$\hat{u}_{LZ}^{new} = \frac{\overrightarrow{O'_L P}}{\|\overrightarrow{O'_L P}\|} \tag{83}$$

$$\hat{u}_{RZ}^{new} = \frac{\overrightarrow{O'_R P}}{\|\overrightarrow{O'_R P}\|} \tag{84}$$

To simplify the calculation and description of the equations, $\hat{u}_{LZ}^{new}$, $\hat{u}_{RZ}^{new}$ are decomposed into vertical and horizontal components, and defined below:

$$\hat{u}_{LZ}^{new}|_\perp = (\hat{u}_{LZ}^{new} \hat{u}''''_{LY})\hat{u}''''_{LY};\ \hat{u}_{LZ}^{new}|_= \hat{u}_{LZ}^{new} - (\hat{u}_{LZ}^{new} \hat{u}''''_{LY})\hat{u}''''_{LY} \tag{85}$$

$$\hat{u}_{RZ}^{new}|_\perp = (\hat{u}_{RZ}^{new} \hat{u}''''_{RY})\hat{u}''''_{RY};\ \hat{u}_{RZ}^{new}|_= \hat{u}_{RZ}^{new} - (\hat{u}_{RZ}^{new} \hat{u}''''_{RY})\hat{u}''''_{RY} \tag{86}$$

Track a Convergent Point in the Vertical Direction.

Tracking a convergent point in the vertical direction refers to the calculation of $\Delta\phi$ along the vertical direction, compared with the old visual axis and the new visual axis $\hat{u}_{LZ}^{new}$. As described above, the characteristics of human eyes parallax indicate that the angles of the left and right visual axis in the vertical direction are nearly the same, and thus it is necessary to calculate the angle for one of the eyes only, and the calculation is given below:

$$\Delta\phi = \cos^{-1}(\hat{u}_{LZ}^{new} \hat{u}''''_{LY}) - \pi/2 \tag{87}$$

(1) Track the Convergent Point Upward ($\Delta\phi<0$)

For the world coordinate system, if the object point $P(X_P, Y_P, Z_P)$ is higher than the convergent point $V(X_V, Y_V, Z_V)$ or $Z_P>Z_V$, then $\cos(\hat{u}_{LZ}^{new} \hat{u}''''_{LY})>0$. Therefore, the included angle between $\hat{u}_{LZ}^{new}$ and $\hat{u}''''_{LY}$ is smaller than $\pi/2$, and $\Delta\phi<0$ (2) Track a Convergent Point Downward ($\Delta\phi>0$)

If the object point $P(X_P, Y_P, Z_P)$ is lower than the convergent point $V(X_V, Y_V, Z_V)$ or $Z_P<Z_V$, then $\cos(\hat{u}_{LZ}^{new} \hat{u}''''_{LY})<0$. Therefore, the included angle between $\hat{u}_{LZ}^{new}$ and $\hat{u}''''_{LY}$ is greater than $\pi/2$, and $\Delta\phi>0$.

Track a Convergent Point in the Horizontal Direction.

The change $\Delta\theta_L$ of convergent point in the horizontal direction can be calculated from the included angle between and $\hat{u}_{LZ}^{new}|$ and $\hat{u}''''_{LY}$, and the change $\Delta\theta_R$ can be calculated from the included angle between $\hat{u}_{LZ}^{new}|$ and $\hat{u}''''_{LY}$ below:

$$\Delta\theta_L = \cos^{-1}\frac{(\hat{u}_{LZ}^{new}|_P)g\hat{u}''''_{LZ}}{\sqrt{(\hat{u}_{LZ}^{new}|_P)g(\hat{u}_{LZ}^{new}|_P)}} \tag{88}$$

$$\Delta\theta_R = \cos^{-1}\frac{(\hat{u}_{RZ}^{new}|_P)g\hat{u}''''_{RZ}}{\sqrt{(\hat{u}_{RZ}^{new}|_P)g(\hat{u}_{RZ}^{new}|_P)}} \tag{89}$$

Assumed that the tracking is a small-angle tracking, which means that the change of angle of $\Delta\theta_L$ and $\Delta\theta_R$ is relatively small, the value of the trigonometric function $\cos \Delta\theta_L$ or $\cos \Delta\theta_R$ is eventually positive, regardless of the angle $\Delta\theta_L$, $\Delta\theta_R$ being positive or negative. Therefore, the positive or negative value of $\Delta\theta_L$ and $\Delta\theta_R$ is determined by the relative position of the object point $P(X_P, Y_P, Z_P)$ and the original convergent point $V(X_V, Y_V, Z_V)$ as shown in FIG. 5(e). The determination is divided into the following four types:

(3) Track a Convergent Point on the Right Side ($\Delta\theta_L<0$ and $\Delta\theta_R<0$).

For the world coordinate system, if the geometric relations $\overrightarrow{O''_L V} \times \overrightarrow{O''_L P} \hat{u}''''_{LY} < 0$ and $\overrightarrow{O''_R V} \times \overrightarrow{O''_R P} \hat{u}''''_{RY} < 0$ exist, then the object point $P(X_P, Y_P, Z_P)$ is considered to be on the right side of the convergent point $V(X_V, Y_V, Z_V)$, and thus $\Delta\theta_L<0$ and $\Delta\theta_R<0$.

(4) Track a Convergent Point on the Left Side ($\Delta\theta_L>0$ and $\Delta\theta_R>0$)

For the world coordinate system, if the geometric relations $\overline{O''_L V} \times \overline{O''_L P} \hat{u}''''_{LY}>0$ and $\overline{O''_R V} \times \overline{O''_R P} \hat{u}''''_{RY}>0$ exist, then the object point $P(X_P, Y_P, Z_P)$ is considered to be on the left side of the convergent point $V(X_V, Y_V, Z_V)$ left, and thus $\Delta\theta_L>0$ and $\Delta\theta_R>0$.

(5) Track a Convergent Point at a Near Side ($\Delta\theta_L<0$ and $\Delta\theta_R>0$)

For the world coordinate system, if the geometric relations $\overline{O''_L V} \times \overline{O''_L P} \hat{u}''''_{LY}<0$ and $\overline{O''_R V} \times \overline{O''_R P} \hat{u}''''_{RY}>0$, then the object point $P(X_P, Y_P, Z_P)$ is considered to be at the front side of the convergent point $V(X_V, Y_V, Z_V)$, and thus $\Delta\theta_L<0$ and $\Delta\theta_R>0$.

(6) Track a Convergent Point at a Far End ($\Delta\theta_L>0$ and $\Delta\theta_R<0$)

For the world coordinate system, if the geometric relations $\overline{O''_L V} \times \overline{O''_L P} \hat{u}''''_{LY}>0$ and $\overline{O''_R V} \times \overline{O''_R P} \hat{u}''''_{RY}<0$, exist, then the object point $P(X_P, Y_P, Z_P)$ is considered to be at the rear side of the convergent point $V(X_V, Y_V, Z_V)$, and thus $\Delta\theta_L>0$ and $\Delta\theta_R<0$.

According to Equations (87)~(89), the new convergent point parameter is $$(\theta_L^{New}, \theta_R^{New}, \phi^{New}, \Omega^{New}, \Phi^{New}, S^{New}) = (\theta_L+\Delta\theta_L, \theta_R+\Delta\theta_R, \phi+\Delta\phi, \Theta, \Phi, S) \quad (90)$$

Further, the vector of the central visual axis is changed from $\overline{O''_H V}$ to $\overline{O''_H P}$, and the angle of the new central visual axis is calculated as follows:

$$\theta_M^{New} = \cos^{-1}\left(\frac{\overline{o''_u P} - (\overline{o''_u P} g \hat{j}''_N) \hat{j}''_N}{\|\overline{o''_u P} - (\overline{o''_u P} g \hat{j}''_N) \hat{j}''_N\|} g \hat{i}''_N\right) - \frac{\pi}{2} \quad (91)$$

Calculation of Large-Angle Tracking

FIGS. 5(f) and 5(g) show schematic views of a large-angle tracking.

As described above, the rotations of a neck and eyeballs change ($\Theta, \Phi, \theta_L, \theta_R, \phi$) and can track an object point at a farther end from the convergent point to achieve the purpose of large-angle tracking. In general, the method of tracking an object point at a farther end from the convergent point usually adjusts the neck parameter ($\Theta, \Phi$) to align the central visual axis with the object point by aright posture of $\overline{O''_H P} \perp \hat{j}''_N$ first. Therefore, the angle $\Theta^{New}$ of the neck coordinate system is rotated horizontally, such that after the object point $P(X_P, Y_P, Z_P)$ falls on the plane $Y'_N$-$Z'_N$ of the neck coordinate system, then the angle $\Phi^{New}$ of the neck coordinate system is rotated vertically, such that the central visual axis is aligned with the object point $P(X_P, Y_P, Z_P)$ by the posture of $\overline{O''_H P} \perp \hat{j}''_N$. Finally in the neck coordinate system $O''_N$, the coordinates of the object point P can be ($x_P, y_P, z_P$), and thus the coordinate of the object point P along the axis $X''_N$ is $x_P=0$, and the coordinate of the object point P along the axis $Y''_N$ is $y_P=H$. $\Theta^{New}$ and $\Phi^{New}$ are calculated as follows:

$$\begin{bmatrix} x_P \\ y_P \\ z_P \end{bmatrix} = \begin{pmatrix} \cos\Theta & 0 & -\sin\Theta \\ \sin\Theta\sin\Phi & \cos\Phi & \cos\Theta\sin\Phi \\ \sin\Theta\cos\Phi & -\sin\Phi & \cos\Theta\cos\Phi \end{pmatrix} \begin{bmatrix} X_P \\ Y_P \\ Z_P \end{bmatrix} \quad (92)$$

$$= \begin{bmatrix} X_P\cos\Theta - Z_P\sin\Theta \\ X_P\sin\Theta\sin\Phi + Y_P\cos\Phi + Z_P\cos\Theta\sin\Phi \\ X_P\sin\Theta\cos\Phi - Y_P\sin\Phi + Z_P\cos\Theta\cos\Phi \end{bmatrix}$$

-continued $$\therefore \Theta^{New} = \tan^{-1}\left(\frac{X_P}{Z_P}\right) \quad (93)$$

$$(X_P\sin\Theta^{New} + Z_P\cos\Theta^{New})\sin\Phi^{New} + Y_P\cos\Phi^{New} = H \quad (94)$$

After the new parameter ($\Theta^{New}, \Phi^{New}$) of the neck is decided, the new parameter ($\theta_L^{New}, \theta_R^{New}, \phi^{New}$) of the rotation of eyeballs can be determined. Since the central visual axis $\overline{O''_H P}$ has aligned with the object point $P(X_P, Y_P, Z_P)$, therefore the new parameter of the rotation of eyeballs comes with the following relations:

$$-\theta_L^{New} = \theta_R^{New} = \theta^{New}, \varphi^{New} = 0 \quad (95)$$

$$\theta^{New} = \frac{1}{2}\sin^{-1}\left(\frac{\overline{O''_L P} \times \overline{O''_R P}}{\|\overline{O''_L P}\|\|\overline{O''_R P}\|}\right) \quad (96)$$

According to Equation (63), the angle of the new central visual axis is $$\theta_M^{New}=0 \quad (97)$$

The above and other objects, features and advantages of the present invention will become apparent from the following detailed description taken with the accompanying drawing.

DESCRIPTION OF THE PREFERRED EMBODIMENT

Figure 1:
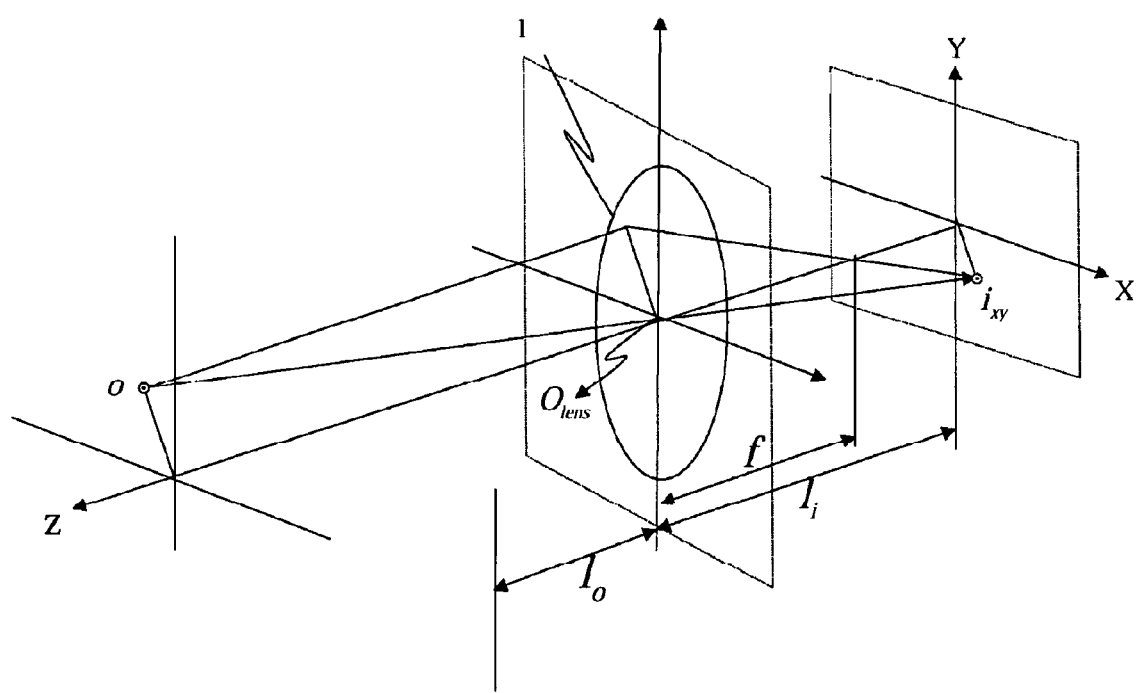
FIG. 1 is a schematic view of forming an image by a 2D optical lens.
Figure 2:
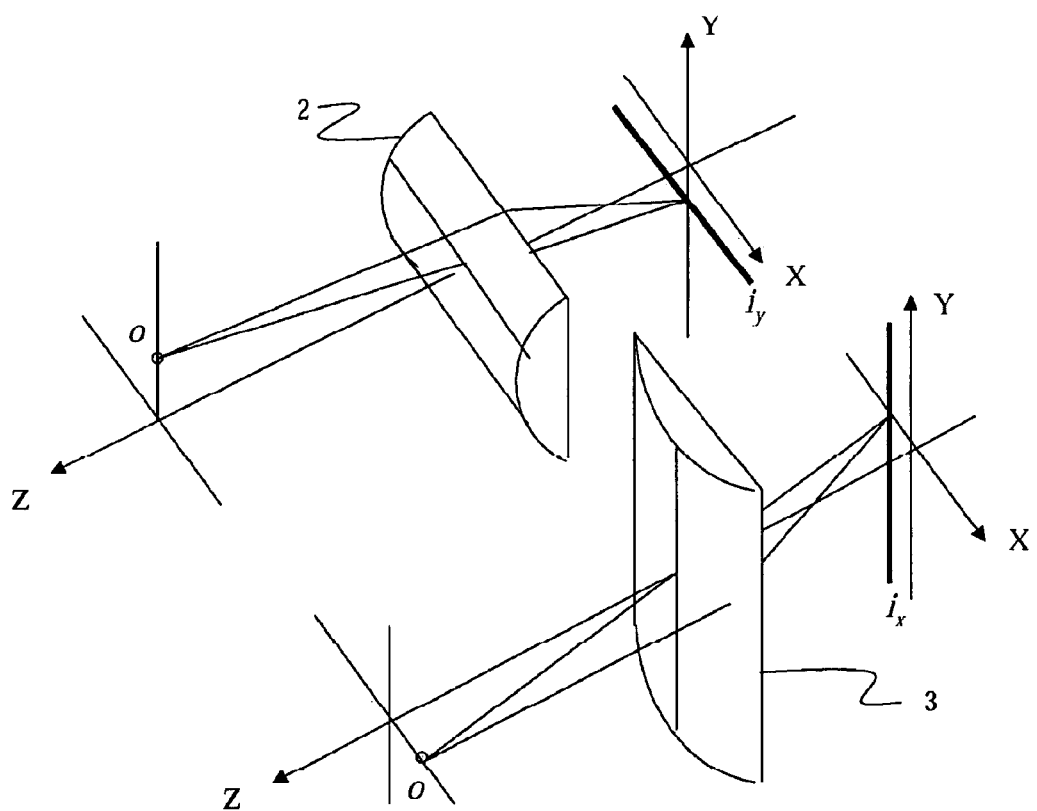
FIG. 2 is a schematic view of forming an image by a 1D optical lens.
Figure 3:
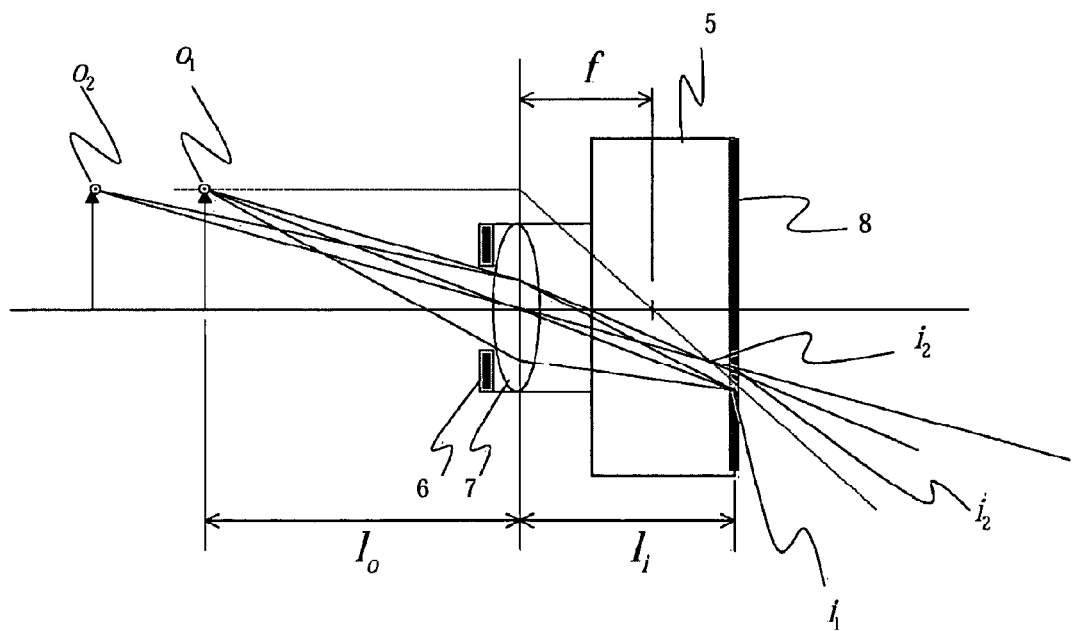
FIG. 3 is a schematic view of a structure of a general optical camera.
Figure 4A:
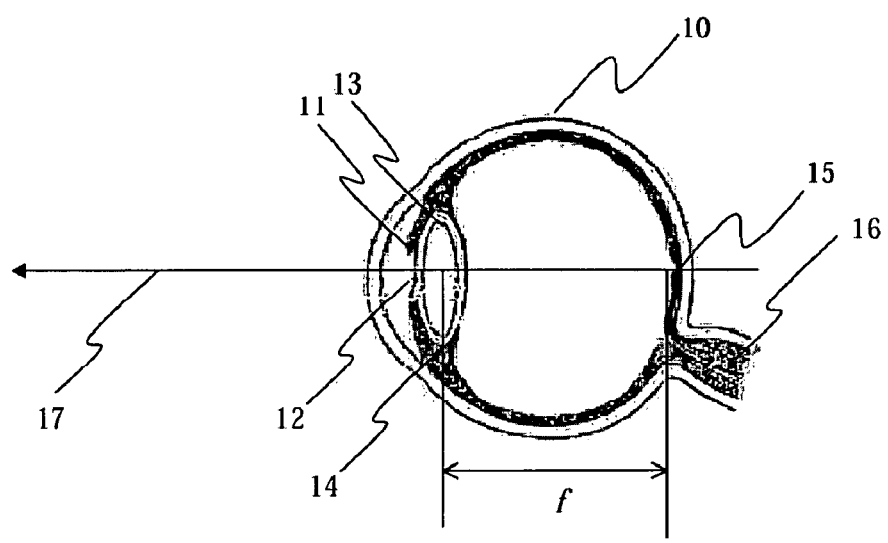
FIG. 4(a) is a schematic view of a structure of a human eyeball.
Figure 4B:
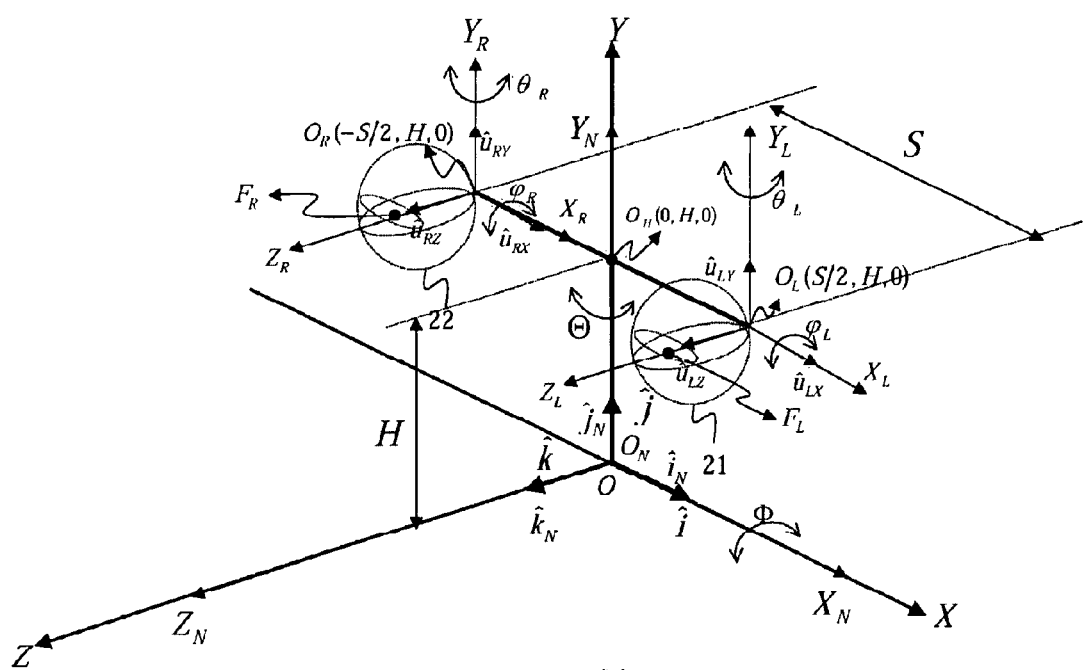
FIG. 4(b) is a schematic view of an initial status of a visual space.
Figure 4C:
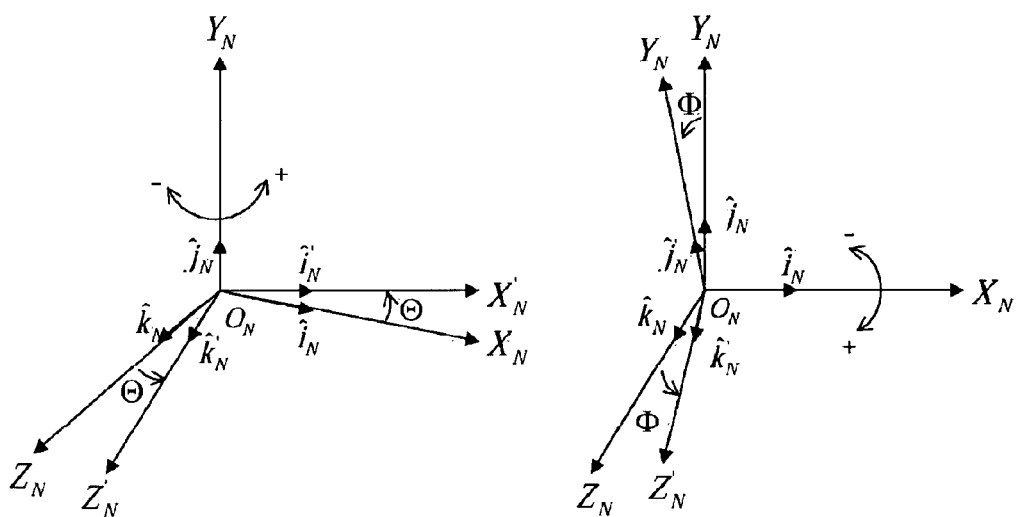
FIG. 4(c) is a schematic view of rotating coordinate axes of a neck coordinate system.
Figure 4D:
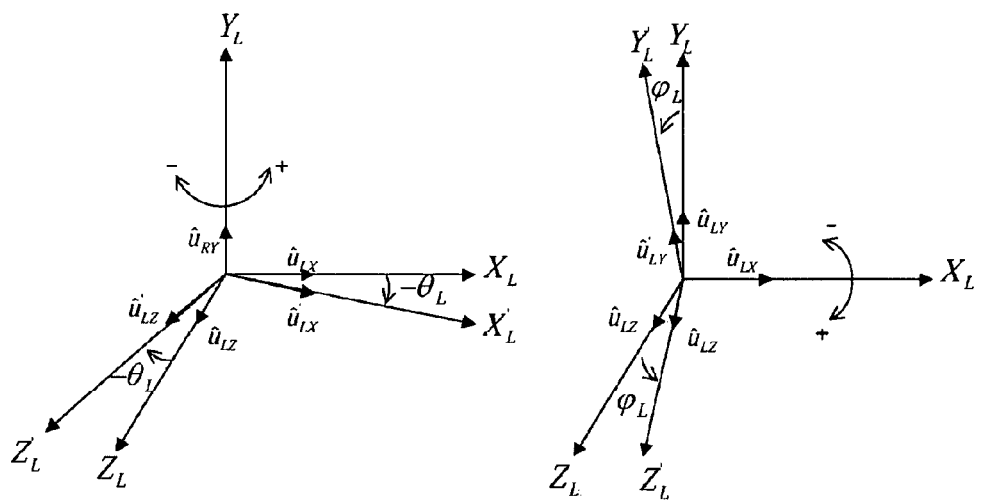
FIG. 4(d) is a schematic view of rotating coordinate axes of a left eye coordinate system.
Figure 4E:
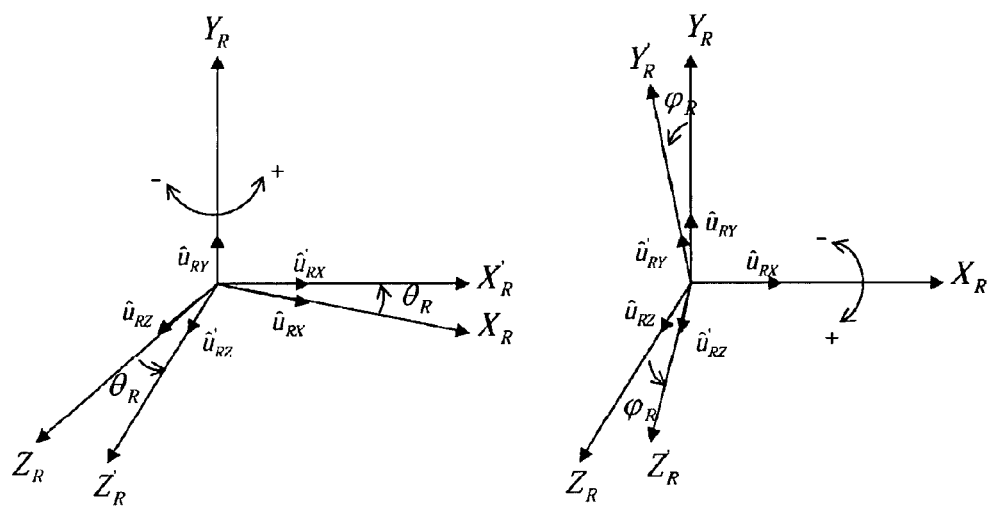
FIG. 4(e) is a schematic view of rotating coordinate axes of a right eye coordinate system.
Figure 4F:
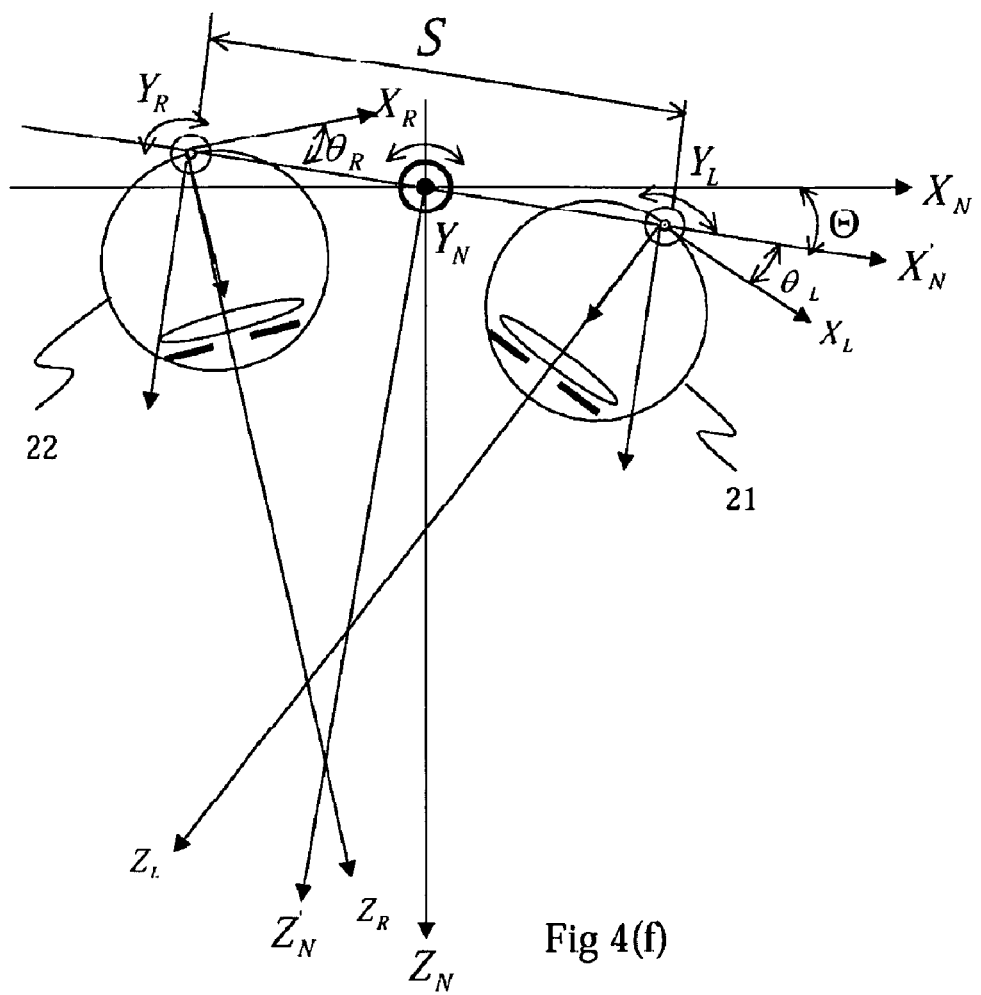
FIG. 4(f) is a schematic view of rotating left and right eyes in a horizontal direction.
Figure 4G:
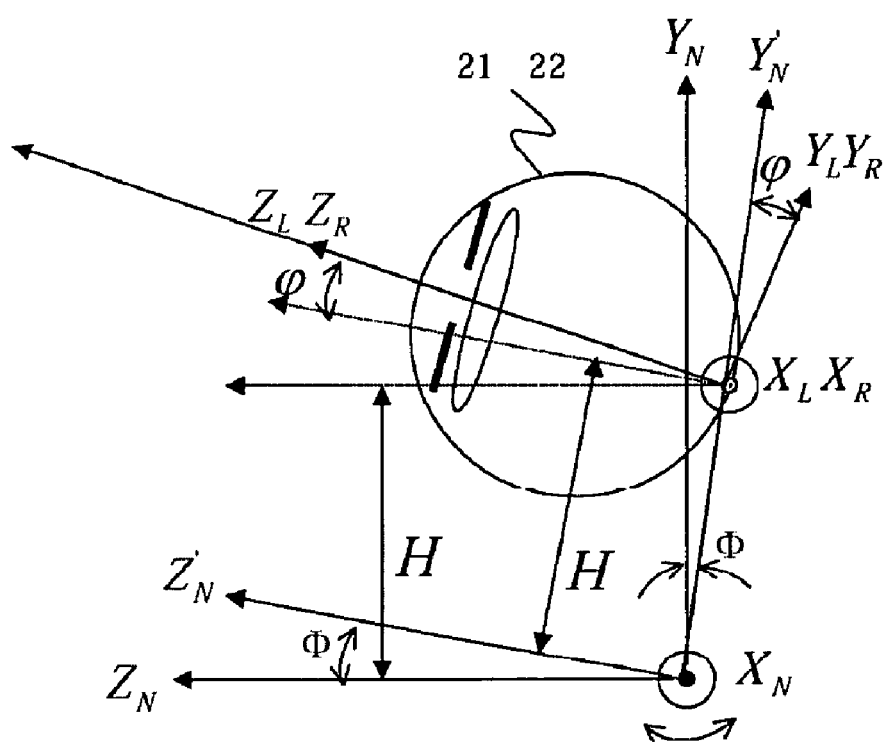
FIG. 4(g) is a schematic view of rotating an eyeball in a vertical direction.
Figure 4H:
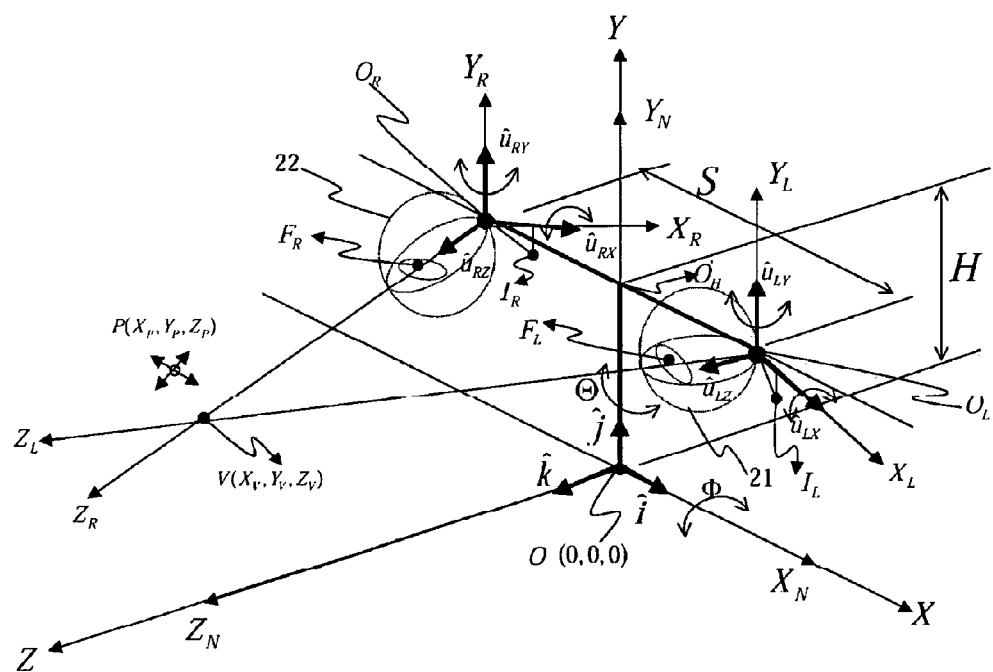
FIG. 4(h) is a schematic geometric view of a convergent point, an object point and each coordinate when two eyes are staring at an object.
Figure 5A:
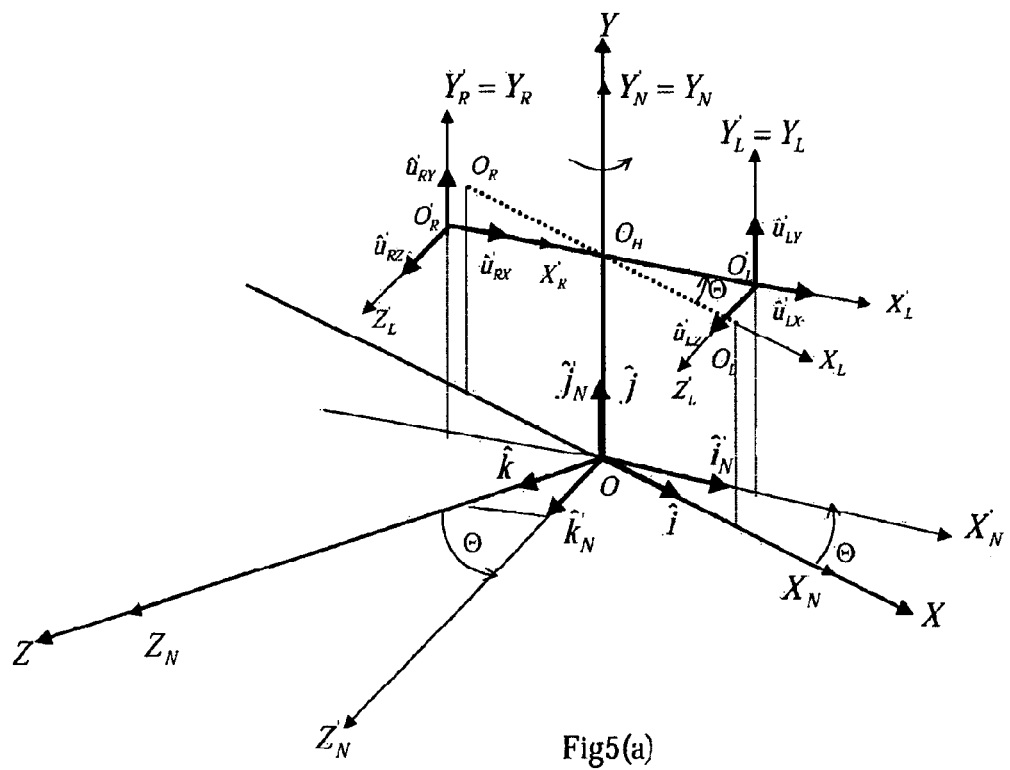
FIG. 5(a) shows a relative geometric relation of each coordinate system, when a neck coordinate system rotates in an angle $\Theta$ with respect to a $Y_N$ axis.
Figure 5B:
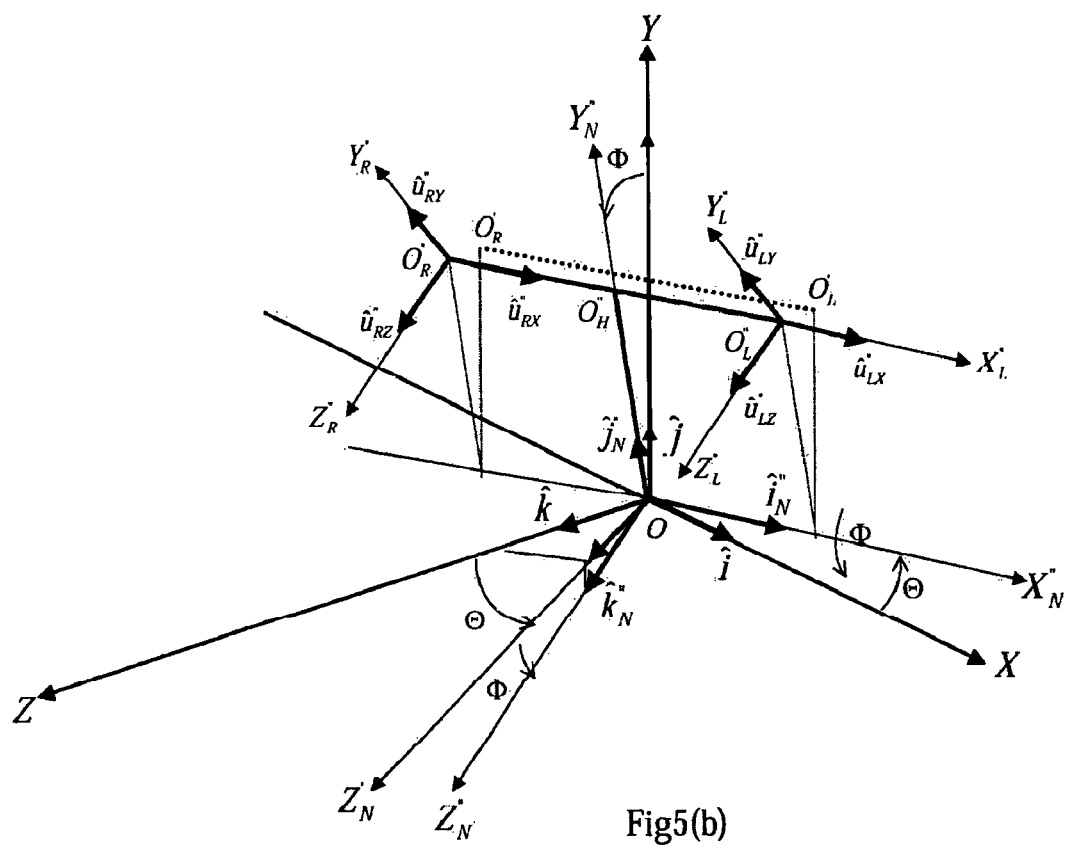
FIG. 5(b) shows a relative geometric relation of each coordinate system, when a neck coordinate system rotates in an angle $\Phi$ with respect to a $X_N$ axis.
Figure 5C:
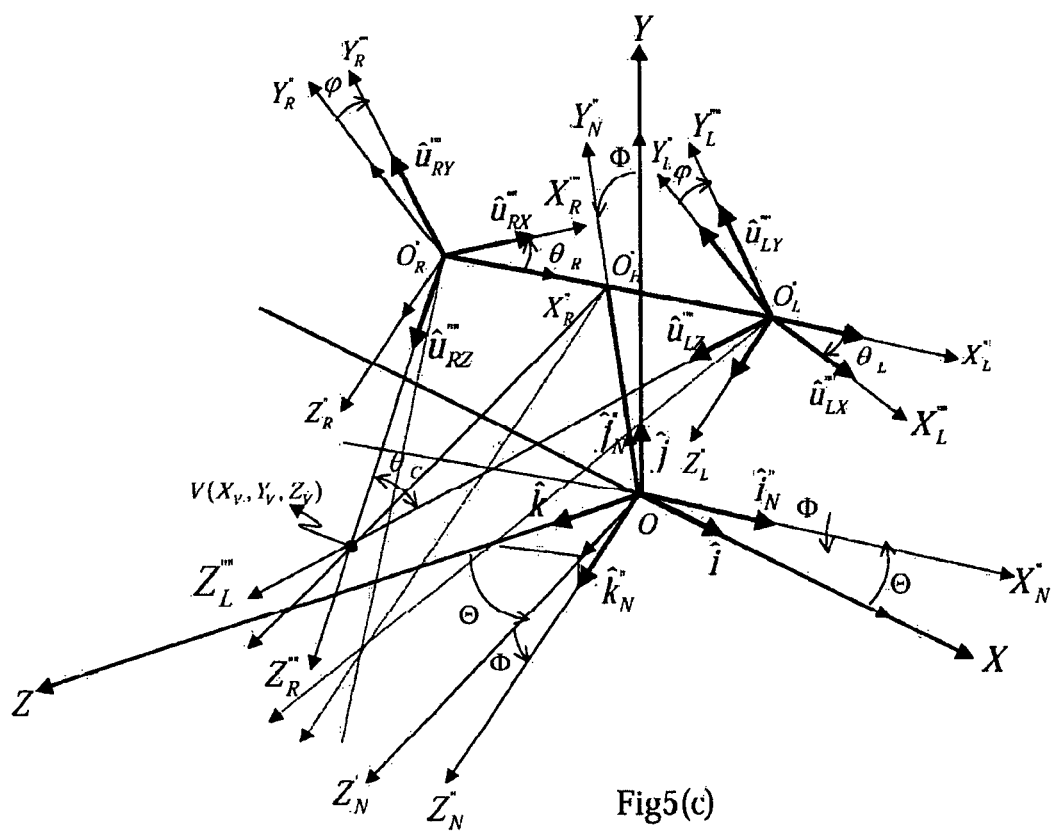
FIG. 5(c) a schematic view of a geometric variation relation of left and right eye coordinate systems when the left and right eye coordinate systems rotate at an angle of $\theta_L, \theta_R$ or $\phi$.
Figure 5D:
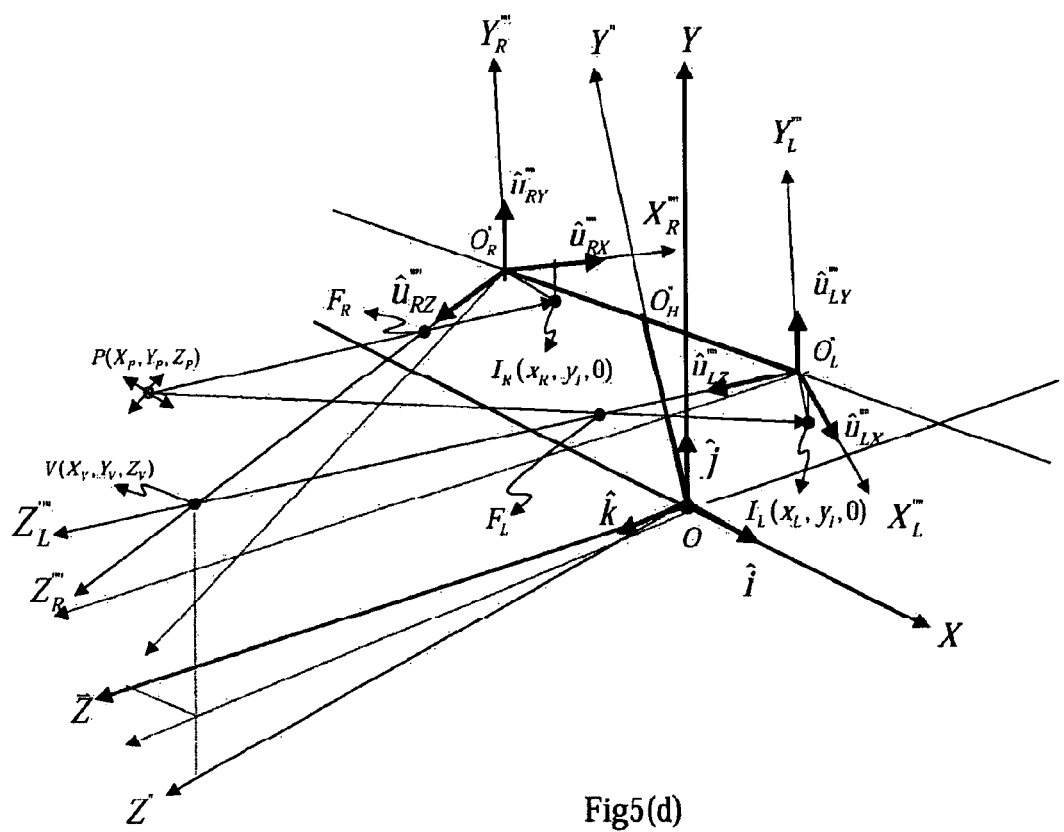
FIG. 5(d) is a schematic view of a geometric relation of each coordinate system, convergent point, object point and image point of a known visual axis visual parameter.
Figure 5E:
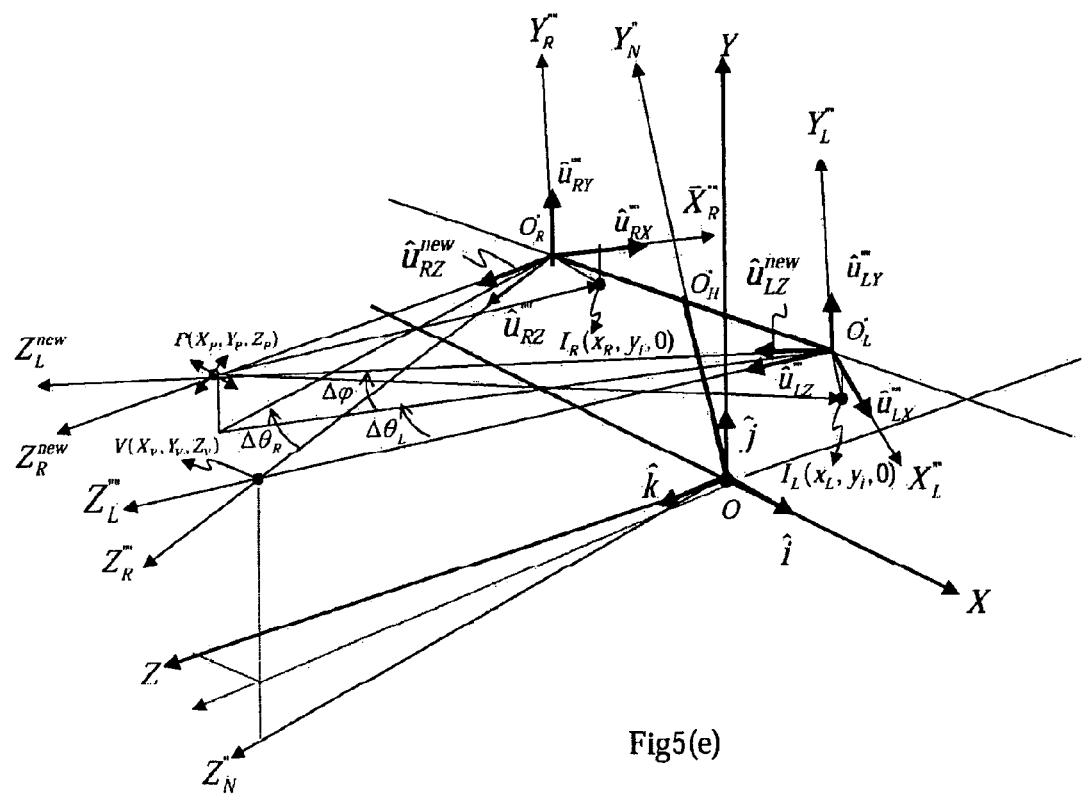
FIG. 5(e) is a schematic view of tracking a small-angle object point.
Figure 5F:
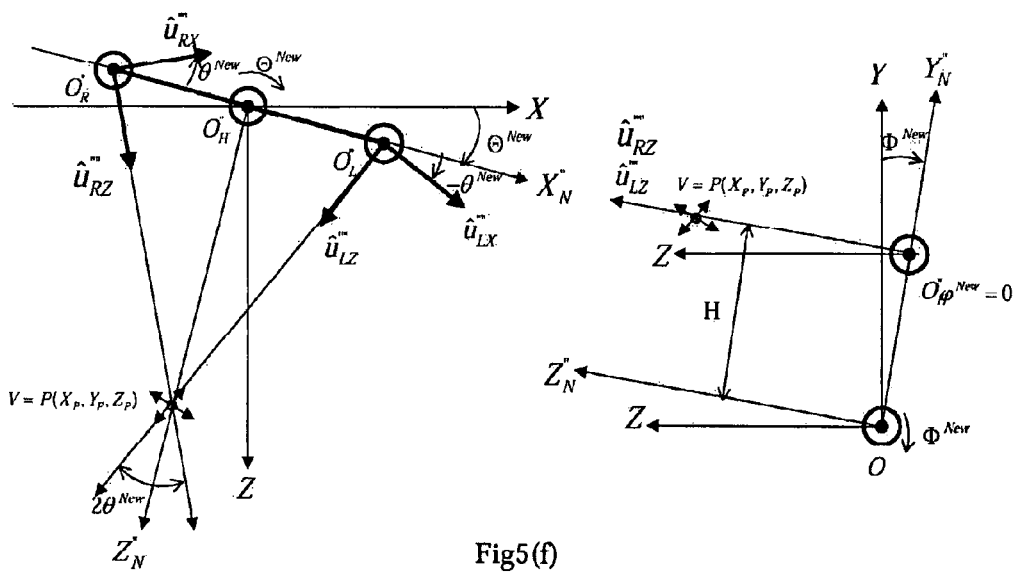
FIG. 5(f) is a schematic planar view of tracking a large-angle object point.
Figure 5G:
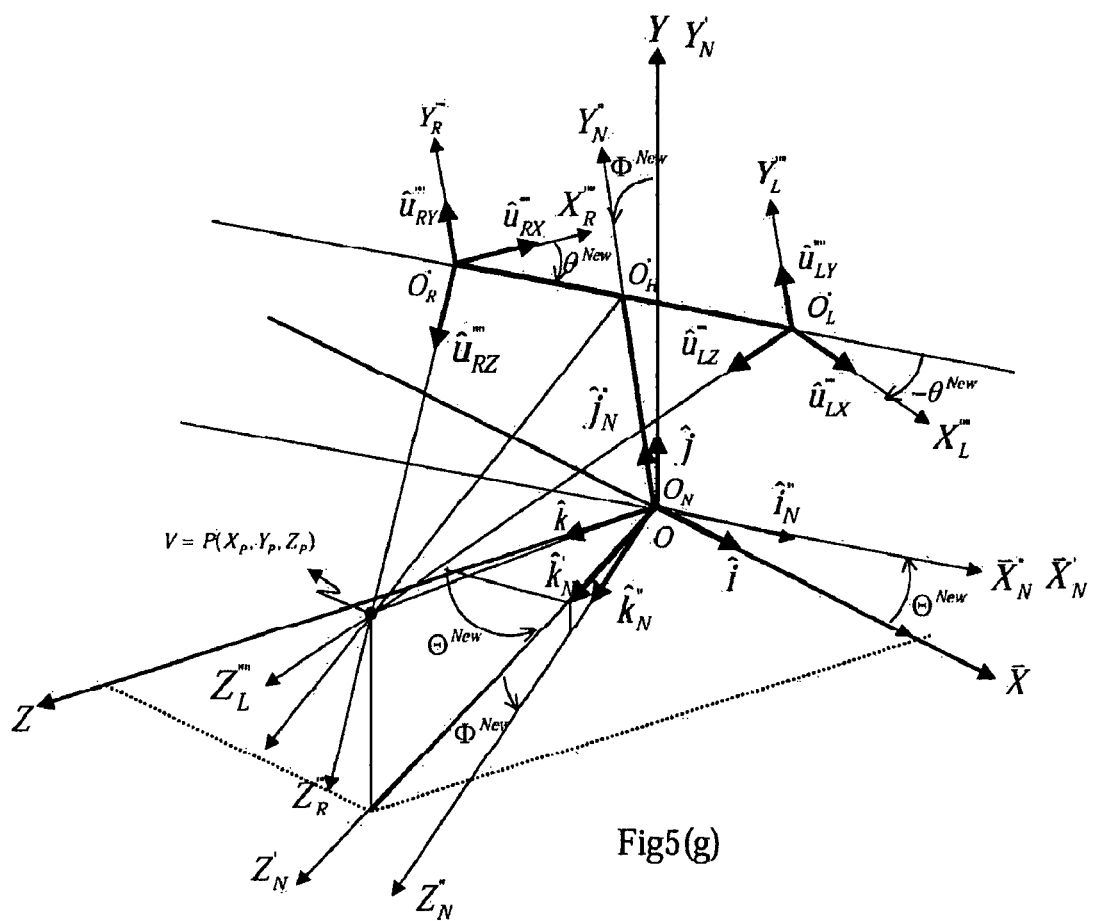
FIG. 5(g) is a schematic view of tracking a large-angle object point.
Figure 6A:
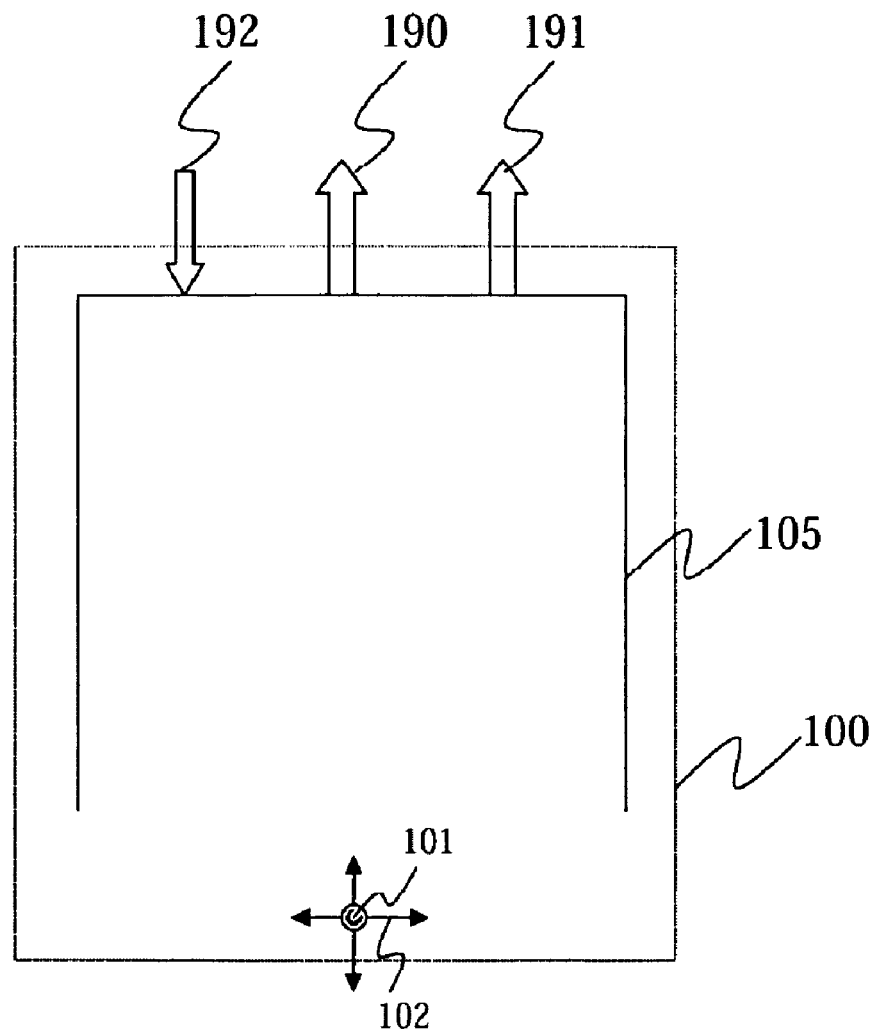
FIG. 6(a) is a schematic view of a method in accordance with a first preferred embodiment of the present invention.

Referring to FIG. 6(a) for a schematic view of a method or recognizing a spatial point in accordance with a first preferred embodiment of the present invention, the method 100 comprises a point light source 101 and a spatial point recognition device 105. The point light source 101 is formed by an active point light source capable of emitting scattered visible light or non-visible light 102 or a passive point light source which is a light reflecting body for reflecting light from other light sources. The spatial point recognition device 105 receives the scattered light 102 emitted by the point light source 101 and output a set of convergent point coordinates signals $(X_V, Y_V, Z_V)$ 190 of the spatial point recognition device 105 and a set of object point coordinates signals $(X_P, Y_P, Z_P)$ 191 of the point light source 101. Further, the spatial point recognition device is capable of moving the convergent point, such that the convergent point is moved to superimpose the coordinates of the convergent point with the coordinates of the object points to achieve the purpose of tracking the object point automatically. At the same time, the spatial point recognition device 105 can receive the coordinates signal $(X_V^{New}, Y_V^{New}, Z_V^{New})$ 192 of a new convergent point provided by other external devices to reset the position of the convergent point, so as to and achieve the purpose of resetting the convergent point of the spatial point recognition device 105.

Figure 6B:
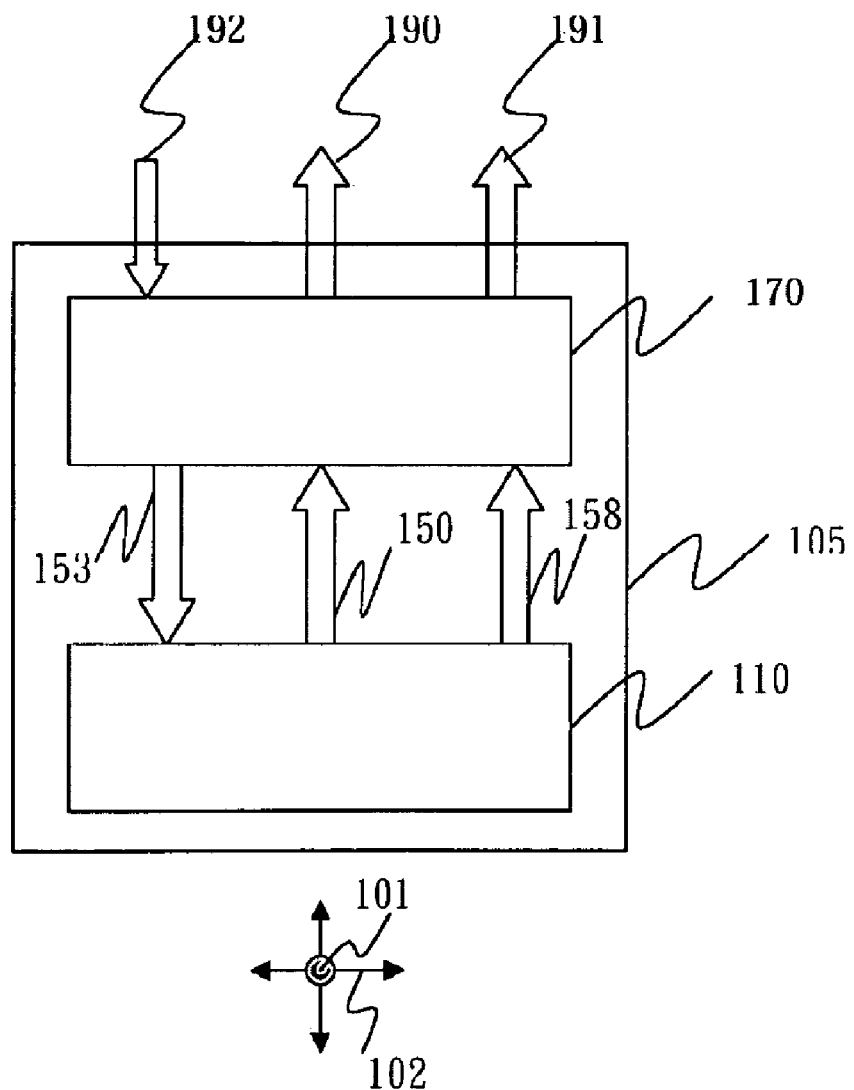
FIG. 6(b) is a schematic view of a spatial point recognition device in accordance with a first preferred embodiment of the present invention.

FIG. 6(b) shows a schematic view of a spatial point recognition device in accordance with a first preferred embodiment of the present invention, the spatial point recognition device 105 comprises a parallax imaging device 110 and a spatial point computing device 170. The parallax imaging device 110 receives a light 102 emitted by the point light source 101 and output a set of convergent point parameter signals $(\theta_L, \theta_R, \phi, \Omega, \Phi, S, f)$, 150 and a pair of left and right 2D image signals 158 with a parallax signal $(x_L, x_R, y_i)$. In addition, the parallax imaging device 110 also receives a set of new convergent point parameter signal $(\theta_L^{New}, \theta_R^{New}, \phi^{New}, \Omega^{New}, \Phi^{New}, S^{New})$ 153 outputted by the spatial point computing device 170 to change the position of the convergent point of the parallax imaging device 110. The spatial point computing device 170 receives the convergent point parameter signal $(\theta_L, \theta_R, \phi, \Omega, \Phi, S, f)$ 150, and a pair of left and right 2D image signals 158 with a parallax signal $(x_L, x_R, y_i)$ to calculate and output the convergent point coordinates signal $(X_V, Y_V, Z_V)$ 190 of the parallax imaging device according to Equations (58), (59) and (60), and calculate and output the object point coordinates signal $(X_P, Y_P, Z_P)$ 191 of the point light source 101 according to Equations (80), (81) and (82), and also calculate and output a set of new convergent point parameter signals $(\theta_L^{New}, \theta_R^{New}, \phi^{New}, \Omega^{New}, \Phi^{New}, S^{New})$ 153 according to Equations (87), (88), (89) and (90) to achieve the purpose of small-angle tracking. Further, a new convergent point parameter signal $(\theta_L^{New}, \theta_R^{New}, \phi^{New}, \Omega^{New}, \Phi^{New}, S^{New})$ 153 is calculated and outputted according to Equations (93), (94), (95) and (96) to achieve the purpose of large-angle tracking. The spatial point computing device 170 also can receive an external new convergent point coordinates signal $(X_V^{New}, Y_V^{New}, Z_V^{New})$ 192, and after $(X_V^{New}, Y_V^{New}, Z_V^{New})$ is substituted into $(X_P, Y_P, Z_P)$ of Equations (93), (94), (95) and (96) to compute another set of new convergent point parameter signals 153 $(\theta_L^{New}, \theta_R^{New}, \phi^{New}, \Omega^{New}, \Phi^{New}, S^{New})$ the signal is outputted compulsorily to achieve the purpose of resetting a convergent point.

Figure 6C:
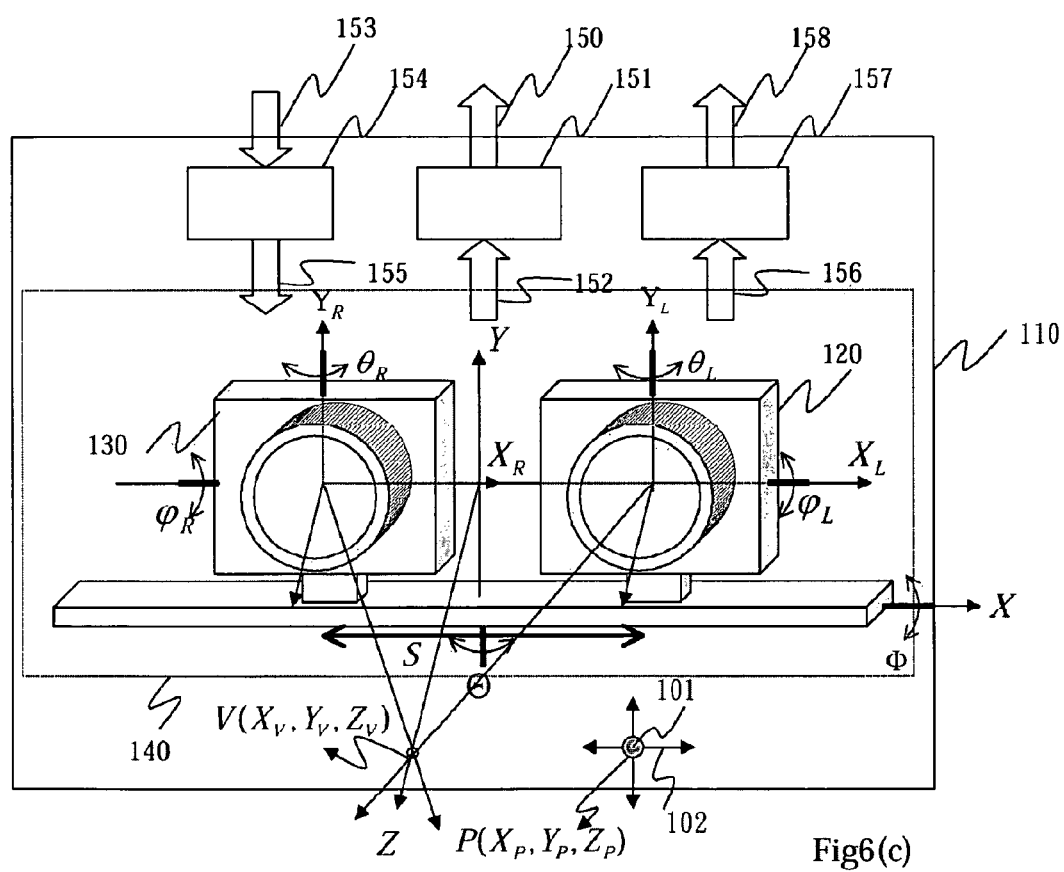
FIG. 6(c) is a schematic view of a parallax imaging device in accordance with a first preferred embodiment of the present invention.
Figure 6D:
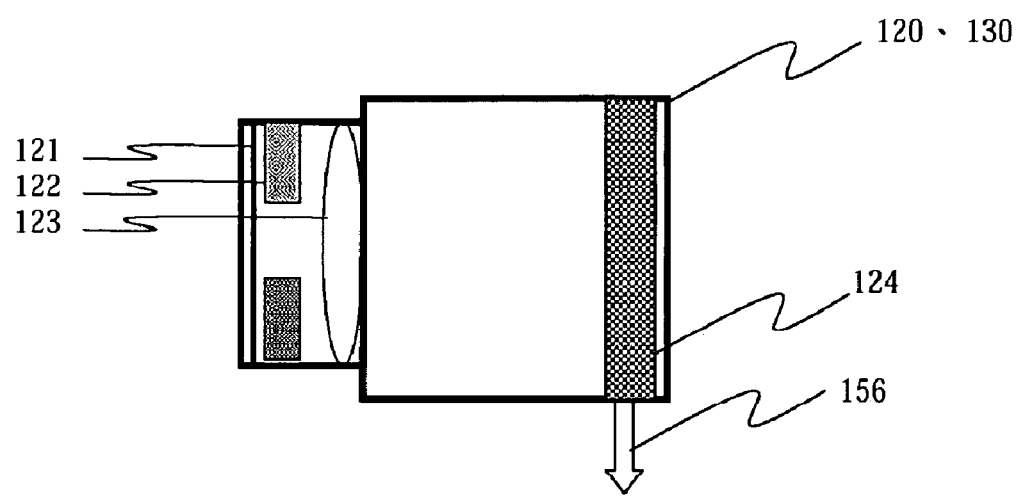
FIG. 6(d) is a schematic view of left and right cameras in accordance with a first preferred embodiment of the present invention.
Figure 6E:
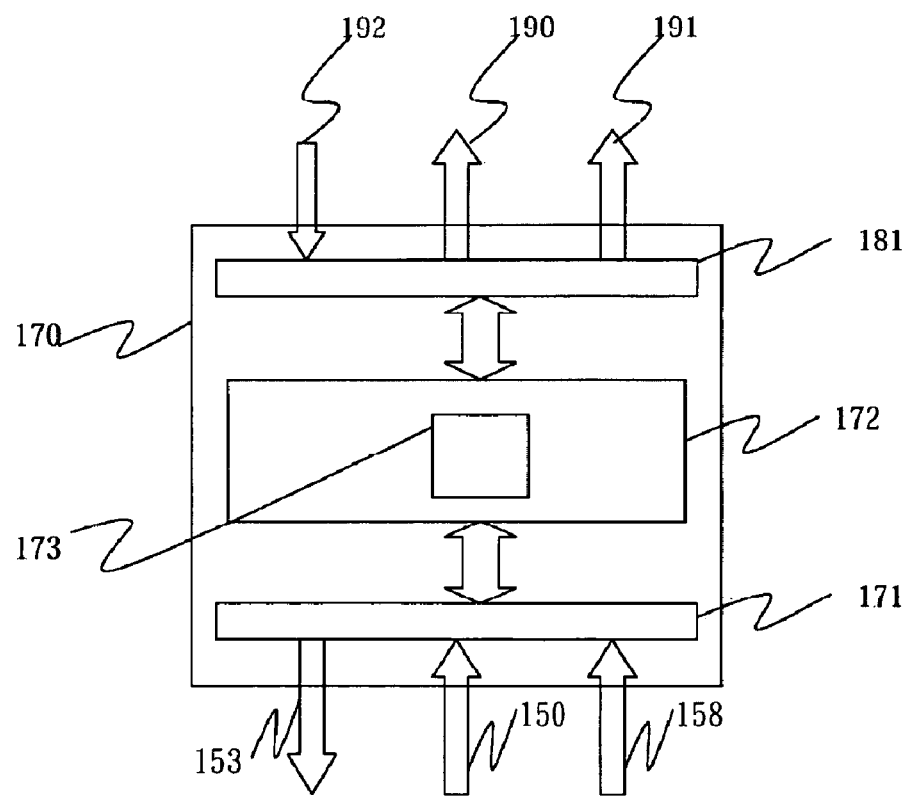
FIG. 6(e) is a schematic view of a spatial point computing device in accordance with a first preferred embodiment of the present invention.

FIG. 6(c) shows a schematic view of a parallax imaging device in accordance with a first preferred embodiment of the present invention, the parallax imaging device 110 comprises a pair of left and right cameras 120, 130, a set of convergent point positioning mechanical device 140, a convergent point reading device 151, a convergent point setting device 154 and a pair of left and right 2D image memory and output devices 157. The left and right cameras 120, 130 are installed on the convergent point positioning mechanical device 140 for receiving a scattered light 102 emitted by the point light source 101 and outputting a pair of left and right 2D image signals 156 respectively. After the left and right 2D image memory and output devices 157 receive the left and right 2D image signals 156, a pair of left and right 2D image signals 158 are stored and outputted. The convergent point positioning mechanical device 140 is a structure having a plurality of rotating and displacing mechanical structures, actuators, and positioning sensors for fixing, carrying, rotating and moving the left and right cameras 120, 130. Since the structure is too complicated to be shown in the figure, and it is generally a prior art of the automation, and thus will not be described here. By receiving a convergent point driving control signal 155, all actuators can be driven to change and reset the direction of the visual axes of the left and right cameras 120, 130, so as to achieve the purpose of changing and resetting the position of the convergent point of a parallax imaging device.

The convergent point reading device 151 can first read the signals of all positioning sensor on the convergent point positioning mechanical device 140 and the signal of the focal length of the camera, and then convert these signals into the convergent point parameter and finally output a convergent point parameter signal $(\theta_L, \theta_R, \phi, \Omega, \Phi, S, f)$ 150. In addition, the convergent point setting device 154 receives a new convergent point parameter signal $(\theta_L^{New}, \theta_R^{New}, \phi^{New}, \Omega^{New}, \Phi^{New}, S^{New})$ 153 and converts the signal 153 into the convergent point driving control signal 155 to output the signal 155. Therefore, the convergent point positioning mechanical device 140 receives the new convergent point driving control signal 155 outputted by the convergent point setting device 154 to achieve the purpose of driving and controlling all actuators (or changing the convergent point).

FIG. 6(*d*) shows a schematic view of left and right cameras in accordance with a first preferred embodiment of the present invention, each of the left and right cameras 120, 130 comprise an optical filter 121, an automatic fine-tuning 2D aperture 122, an automatic focusing 2D lens module 123, and a 2D image sensor 124. The optical filter 121 is provided for filtering a light source with a wavelength other than the wavelength of the point light source; the automatic fine-tuning 2D aperture 122 can be a crevice in the shape of a circular hole, and the hole diameter of the crevice can be controlled and tuned automatically; the automatic focusing 2D lens module 123 is a lens module having the horizontal and vertical direction 2D focusing ability for automatically focusing and outputting the focal length; and the 2D image sensor 124 of the left camera 120 is a general prior art CCD or CMOS for outputting a left 2D image signal 156 with a parallax signal $(x_L, y_i)$. Further, the 2D image sensor 124 of the right camera 130 can be a general prior art CCD or CMOS for outputting a right 2D image signal 156 with a parallax signal $(x_R, y_i)$.

Referring to FIG. 6(*e*) for a schematic view of a spatial point computing device in accordance with a first preferred embodiment of the present invention, the spatial point computing device 170 comprises two electronic interfaces 171, 181, and a computing procedure device 172. The electronic interface 171 is formed by plurality of general electronic components including digital I/O ports, ADCs and DACs to serve as an interface of connecting the parallax imaging device to read the convergent point parameter signal $(\theta_L, \theta_R, \phi, \Omega, \Phi, S, f)$ 150 and a pair of left and right 2D image signal 158 with a parallax signal $(x_L, x_R, y_i)$ and outputting a set of new convergent point parameter signals $(\theta_L^{New}, \theta_R^{New}, \phi^{New}, \Omega^{New}, \Phi^{New}, S^{New})$ 153. The electronic interface 181 is a standard transmission interface formed by a general cable or a wireless RS232, USB or network to serve as an interface of connecting other external devices. With the standard transmission interface, a new convergent point coordinates signal $(X_V^{New}, Y_V^{New}, Z_V^{New})$ 192 can be read, the convergent point coordinates signal $(X_V, Y_V, Z_V)$ 190 of the parallax imaging device and the object point coordinates signal $(X_P, Y_P, Z_P)$ 191 of the point light source can be outputted. The computing procedure device 172 is a microcomputer comprising a general microprocessor, a DSP, and a memory device. The memory device includes a computing logic procedure 173 for processing the 2D image signals 158 to obtain the coordinates $(x_L, y_i)$ and $(x_R, y_i)$ of the left and right point images by finding the brightest point of the image on the 2D image sensor 124. According to the inputted convergent point parameter signal $(\theta_L, \theta_R, \phi, \Omega, \Phi, S, f)$ 150 and the obtained parallax signal $(x_L, x_R, y_i)$, the computing logic procedure 173 computes and outputs a convergent point coordinates signal $(X_V, Y_V, Z_V)$ 190 and an object point coordinates signal $(X_P, Y_P, Z_P)$ 191, and calculate and output a set of new convergent point parameter signals $(\theta_L^{New}, \theta_R^{New}, \phi^{New}, \Omega^{New}, \Phi^{New}, S^{New})$ 153 to achieve the purpose of tracking the object point. Further, the computing logic procedure 173 calculates and outputs a set of new convergent point parameter signals $(\theta_L^{New}, \theta_R^{New}, \phi^{New}, \Omega^{New}, \Phi^{New}, S^{New})$ 153 according to the inputted new convergent point coordinates signals $(X_V^{New}, Y_V^{New}, Z_V^{New})$ 192 to achieve the purpose of resetting the new convergent point.

Referring to FIG. 7(*a*) for a method of recognizing a spatial point in accordance with a second preferred embodiment of the present invention, the method 200 comprises a point light source 201 and a spatial point recognition device 205. The point light source 201 can be an active point light source capable of emitting scattered visible light or non-visible light 202 or a passive point light source which is a light reflecting body for reflecting the light of other light sources. The spatial point recognition device 205 receives the scattered light 202 emitted by the point light source 201 and outputs the convergent point coordinates signal $(X_V, Y_V, Z_V)$ 290 of the spatial point recognition device and the object point coordinates signal $(X_P, Y_P, Z_P)$ 291 of the point light source 201. The spatial point recognition device 205 is capable of moving the convergent point, such that the convergent point is moved to superimpose the coordinates of the convergent point with the coordinates of the object point to achieve the purpose of tracking the object point automatically. At the same time, the spatial point recognition device 205 also receives a new coordinates signal $(X_V^{New}, Y_V^{New}, Z_V^{New})$ 292 of the convergent point provided by other external devices to reset the convergent point of the spatial point recognition device 205, so as to and achieve the purpose of resetting the convergent point of the spatial point recognition device 205.

Referring to FIG. 7(*b*) for a schematic view of a spatial point recognition device in accordance with a second preferred embodiment of the present invention, the spatial point recognition device 205 comprises a parallax imaging device 210, and a spatial point computing device 270. After the parallax imaging device 210 receives the light 202 emitted by the point light source 201, a set of convergent point parameter signals $(\theta_L, \theta_M, \theta_R, \phi, \Omega, \Phi m, S, f)$ 250 and a set of left, middle and right 1D image signals 258 are outputted. In addition, the parallax imaging device 210 also receives a set of new convergent point parameter signals $(\theta_L^{New}, \theta_M^{New}, \theta_R^{New}, \phi^{New}, \Omega^{New}, \Phi^{New}, S^{New})$ 253 outputted by the spatial point computing device 270 to change the convergent point of the parallax imaging device 210. After the spatial point computing device 270 receives the convergent point parameter signal $(\theta_L, \theta_M, \theta_R, \phi, \Omega, \Phi, S, f)$ 250, and a set of 1D image signal 258 with a parallax signal $(x_L, x_R y_i)$, Equations (58), (59) and (60) are used for calculating and outputting the convergent point coordinates signal $(X_V, Y_V, Z_V)$ 290 of the parallax imaging device. Further, Equations (80), (81) and (82) can be used for calculating and outputting of the object point coordinates signal $(X_P, Y_P, Z_P)$ 291 of the point light source 201. In the meantime, Equations (87), (88), (89), (90) and (91) can be used for calculating and outputting a set of new convergent point parameter signals $(\theta_L^{New}, \theta_M^{New}, \theta_R^{New}, \phi^{New}, \Omega^{New}, \Phi^{New}, S^{New})$ 253 to achieve the purpose of small-angle tracking. Equations (93), (94), (95), (96) and (97) can be used for calculating and outputting a set of new convergent point parameter signals $(\theta_L^{New}, \theta_M^{New}, \theta_R^{New}, \phi^{New}, \Omega^{New}, \Phi^{New}, S^{New})$ 253 to achieve the purpose of large-angle tracking. In addition, the spatial point computing device 270 receives an external set of new convergent point coordinates signals $(X_V^{New}, Y_V^{New}, Z_V^{New})$ 292, and substitutes $(X_V^{New}, Y_V^{New}, Z_V^{New})$ to the $(X_P, Y_P, Z_P)$ in Equations (93), (94), (95), (96) and (97) to compute another set of new convergent point parameter signals 253 $(\theta_L^{New}, \theta_M^{New}, \theta_R^{New}, \phi^{New}, \Omega^{New}, \Phi^{New}, S^{New})$, and then output this signal compulsorily to achieve the purpose of resetting the convergent point.

Referring to FIG. 7(*c*) for a parallax imaging device in accordance with a second preferred embodiment of the present invention, the parallax imaging device 210 comprises a left camera 220, a middle camera 225, a right camera 230, a set of convergent point positioning mechanical device 240, a convergent point reading device 251, a convergent point setting device 254 and a left, a middle and a right 1D image memory and output devices 257. After receiving scattered light 202 emitted by the point light source 201, the left, middle and right cameras 220, 225, 230 output a left, middle and right 1D image signals 256 respectively. After the left, middle and right 1D image memory and output devices 257 receive the left, middle and right 1D image signals 256, the left, middle and right 1D image signals 258 are stored and outputted respectively. Further, the left, middle and right cameras 220, 225, 230 are installed onto the convergent point positioning mechanical device 240. The convergent point positioning mechanical device 240 comprises a plurality of rotating and displacing mechanical structures, actuators and positioning sensors for fixing, carrying, rotating and moving the left, middle and right cameras 220, 225, 230. Since the structure is too complicated to be shown in the figure, and it is generally a prior art of the automation, and thus will not be described here. With the device having these automated structures and elements, the parameters ($\theta_L$, $\theta_M$, $\theta_R$, $\phi$, $\Omega$, $\Phi$, S, f) can be changed to achieve the purpose of changing the direction of the visual axis of the left, middle and right cameras 220, 225, 230. Further, the convergent point positioning mechanical device 240 receives a convergent point driving control signal 255 for driving all actuators to change and reset the direction of the visual axis of the left, middle and right cameras 220, 225, 230, so as to achieve the purpose of changing and resetting the position of the convergent point of the parallax imaging device 210.

The convergent point reading device 251 first reads the signals of all positioning sensors on the convergent point positioning mechanical device 240 and the signal of the focal length of the cameras, and then convert these signals into the convergent point parameter and finally output a convergent point parameter signal ($\theta_L$, $\theta_M$, $\theta_R$, $\phi$, $\Omega$, $\Phi$, S, f) 250. Further, the convergent point setting device 254 receives a new convergent point parameter signal ($\theta_L^{New}$, $\theta_M^{New}$, $\theta_R^{New}$, $\phi^{New}$, $\Omega^{New}$, $\Phi^{New}$, $S^{New}$) 253 and converts the signal 253 into the convergent point driving control signal 255 to output the signal 255. Therefore, the convergent point positioning mechanical device 240 can receive the new convergent point driving control signal 255 outputted by the convergent point setting device 254 to achieve the purpose of driving and controlling all actuators or changing the convergent point.

Figure 7A:
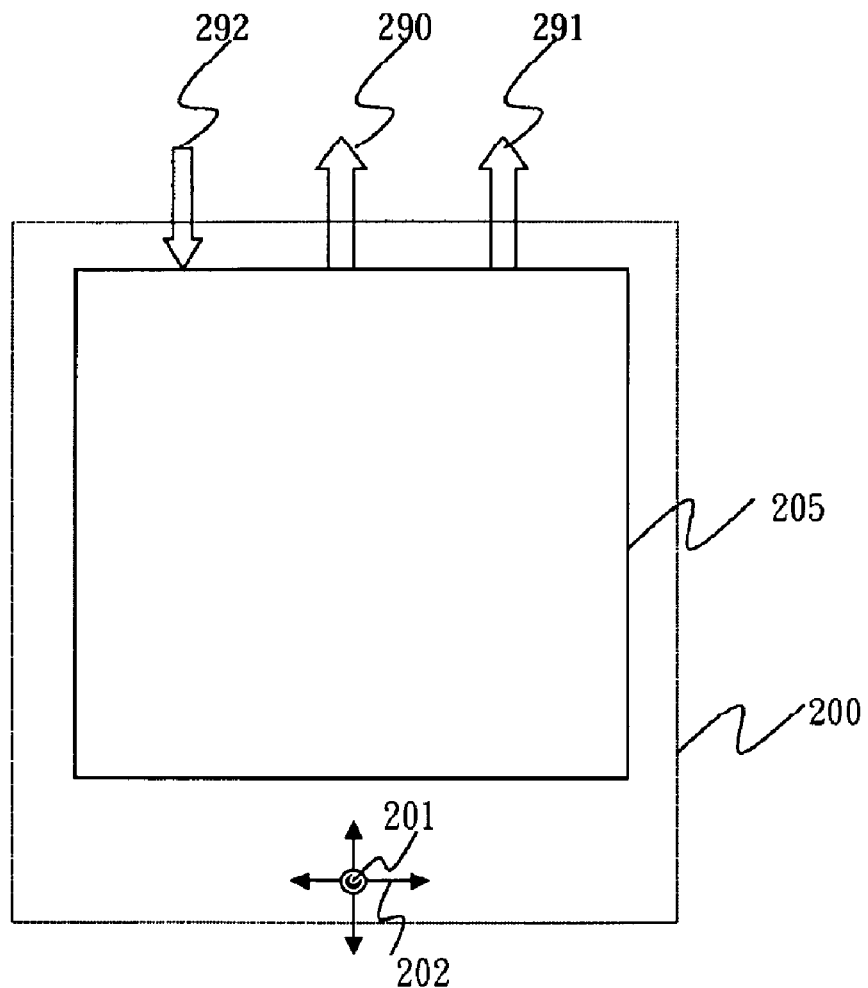
FIG. 7(a) is a schematic view of a method in accordance with a second preferred embodiment of the present invention.
Figure 7B:
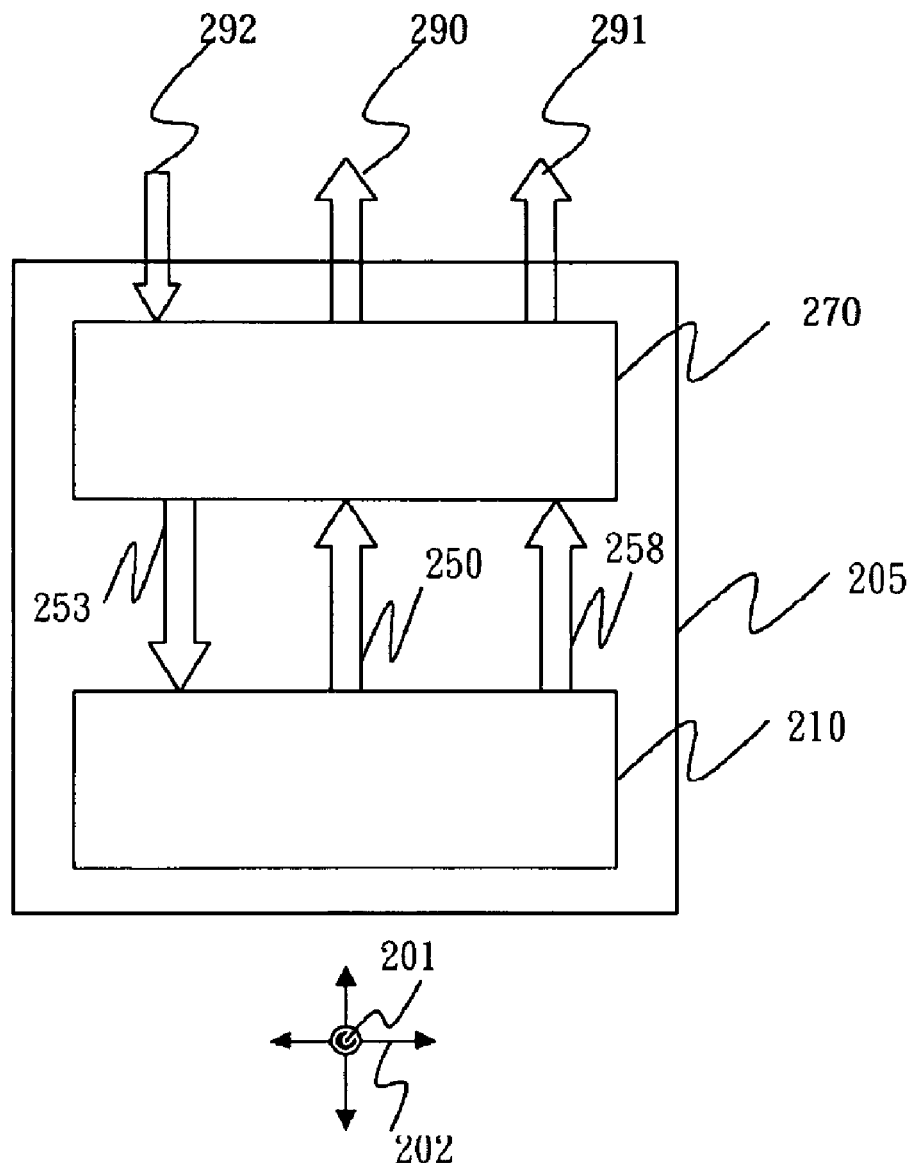
FIG. 7(b) is a schematic view of a spatial point recognition device in accordance with a second preferred embodiment of the present invention.
Figure 7C:
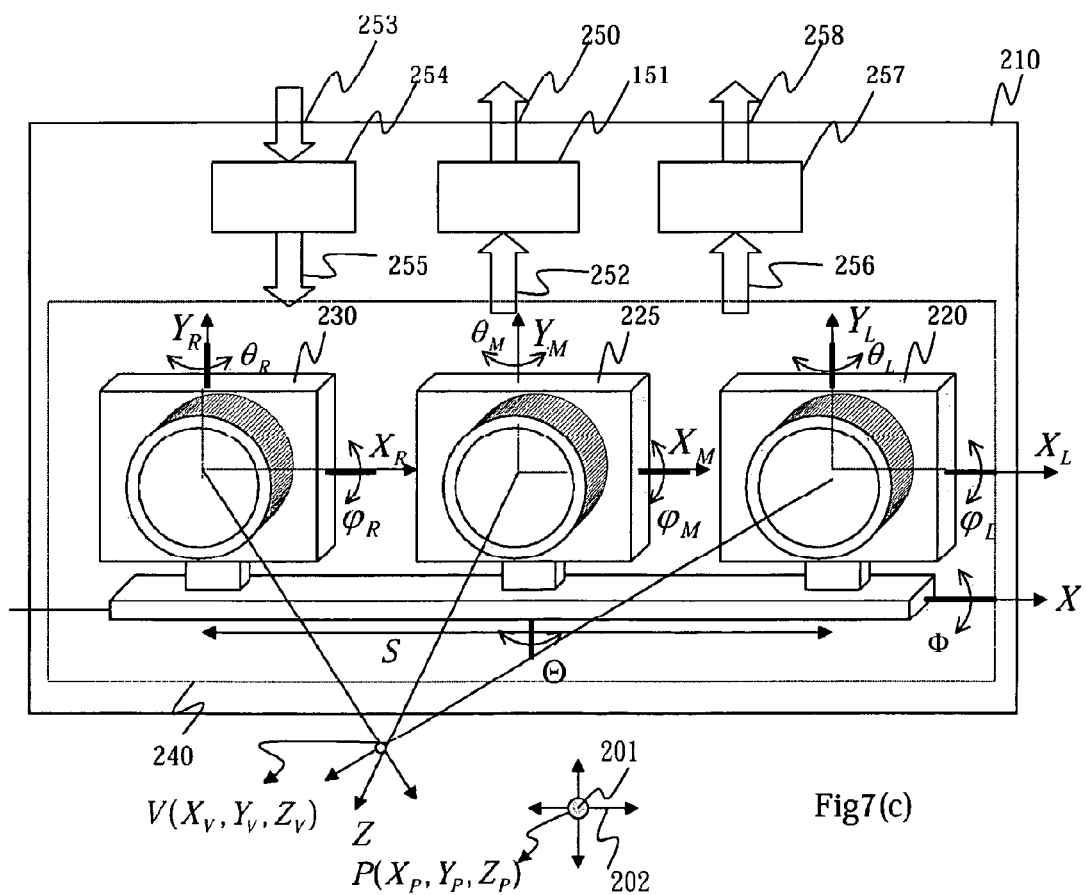
FIG. 7(c) is a schematic view of a parallax imaging device in accordance with a second preferred embodiment of the present invention.
Figure 7D:
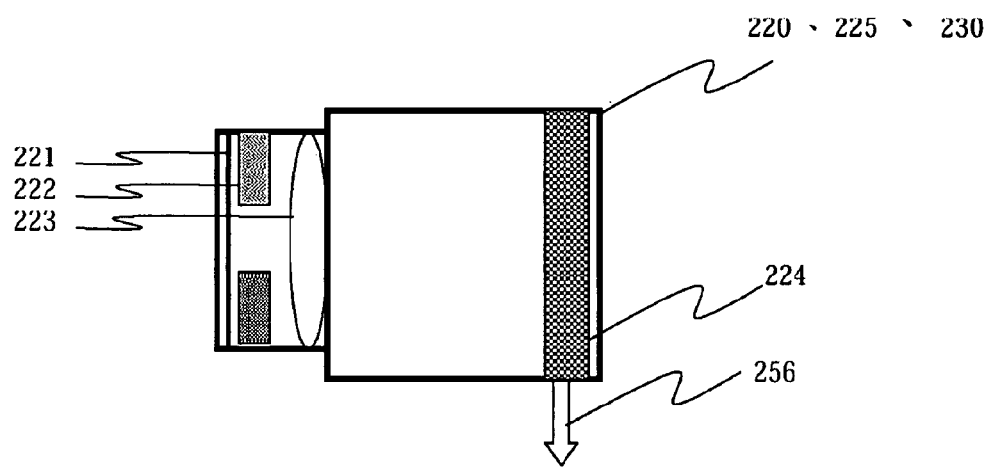
FIG. 7(d) is a schematic view of left, middle and right cameras in accordance with a second preferred embodiment of the present invention.

Referring to FIG. 7(d) for a schematic view of left, middle and right cameras in accordance with a second preferred embodiment of the present invention, each of the left, middle and right cameras 220, 225, 230 comprises an optical filter 221, an automatic fine-tuning 1D aperture 222, an automatic focusing 1D lens module 223, and a 1D image sensor 224. The optical filter is provided for filtering a light source with a wavelength other than the wavelength of the point light source.

In the left camera 220, the 1D aperture 222 is a rectangular slit, whose width can be controlled and tuned automatically, and the direction of the slit is aligned in a vertical direction, which means the longer side of the slit is installed in the vertical direction. The 1D lens module 223 is a lens module with a horizontal focusing ability for automatically focusing and outputting the focal length. The 1D image sensor 224 is formed by a general CCD or CMOS, and the direction of the sensor is aligned in the horizontal direction, which means the longer side of the sensor is installed in the horizontal direction for outputting a left 1D image signal with a parallax signal ($x_L$).

In the middle camera 225, the 1D aperture 222 is a rectangular slit whose width can be controlled and tuned automatically, and the direction of the slit is aligned in the horizontal direction, which means the longer side of the slit is installed in the horizontal direction; the 1D lens module 223 is a lens module having the vertical focusing ability for automatically focusing and outputting the focal length; and the 1D image sensor is formed by a general traditional CCD or CMOS, and the direction of the sensor is aligned in the vertical direction, which means the longer side of the sensor is installed in the vertical direction, for outputting a 1D image signal with a parallax signal ($y_i$).

In the right camera 230, the 1D aperture 222 is a rectangular slit whose width can be controlled and tuned automatically, and the direction of the slit is aligned in the vertical direction, which means the longer side of the slit is installed in the vertical direction; the 1D lens module 223 is a lens module having the horizontal focusing ability, for automatically focusing and outputting the focal length; and the 1D image sensor 224 is formed by a general traditional CCD or CMOS, and the direction of the sensor is aligned in the horizontal direction, which means the longer side of the sensor is installed in the horizontal direction, for outputting a right 1D image signal with a parallax signal ($x_R$).

Figure 7E:
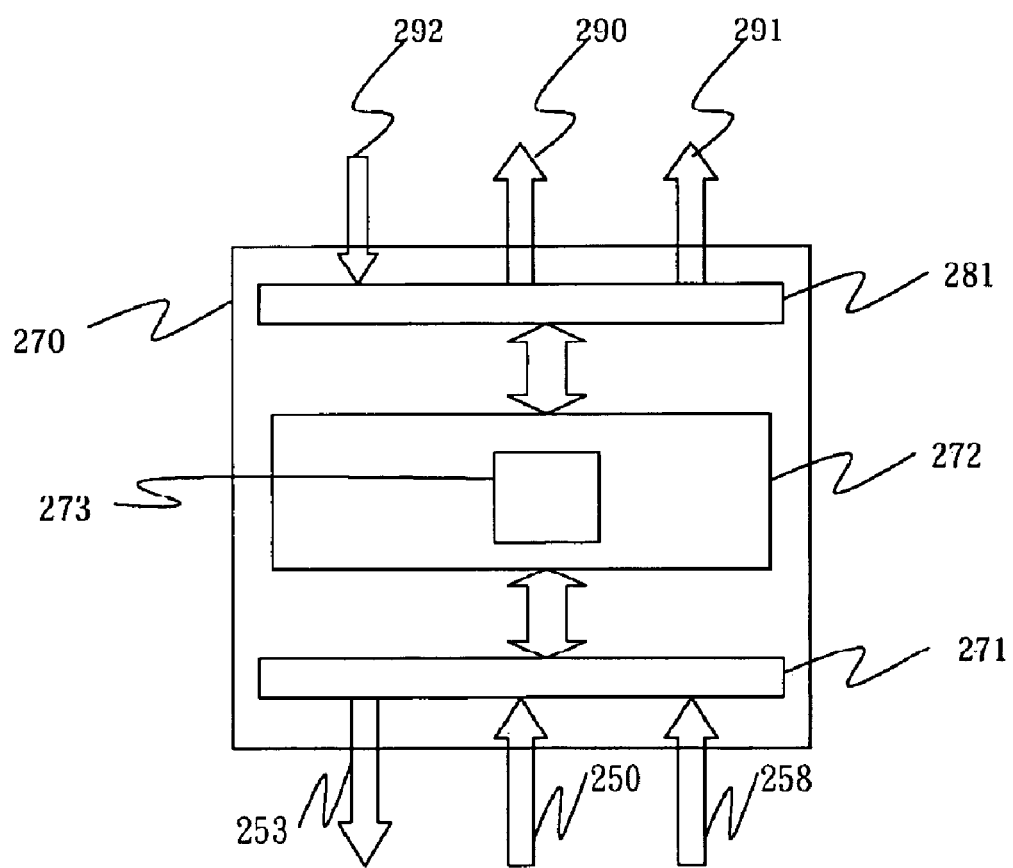
FIG. 7(e) is a schematic view of a spatial point computing device in accordance with a second preferred embodiment of the present invention.

Referring to FIG. 7(e) for a schematic view of a spatial point computing device in accordance with a second preferred embodiment of the present invention, the spatial point computing device 270 comprises two electronic interfaces 271, 281 and a computing procedure device 272.

The electronic interface 271 comprises plurality of general electronic components including digital I/O ports, ADCs and DACs to serve as an interface of connecting the parallax imaging device 210 to read the convergent point parameter signal 250 ($\theta_L$, $\theta_M$, $\theta_R$, $\phi$, $\Omega$, $\Phi$, S, f) and a set of left, middle and right 1D image signals 258 with a parallax signal ($x_L$, $x_R$, $y_i$) and outputting a set of new convergent point parameter signals 253 ($\theta_L^{New}$, $\theta_M^{New}$, $\theta_R^{New}$, $\phi^{New}$, $\Omega^{New}$, $\Phi^{New}$, $S^{New}$).

The electronic interface 281 is a standard transmission interface formed by a general cable or wireless RS232, USB or network to serve as an interface of connecting other external devices. With the standard transmission interface, a new convergent point coordinates signal ($X_V^{New}$, $Y_V^{New}$, $Z_V^{New}$) 292 can be read, the convergent point coordinates signal 290 ($X_V$, $Y_V$, $Z_V$) of the parallax imaging device, and output the object point coordinates signal 291 ($X_P$, $Y_P$, $Z_P$) of the point light source can be outputted The computing procedure device 272 is a microcomputer comprising a general microprocessor, a DSP and a memory device. The memory device includes a computing logic procedure 273 for processing the 1D image signal 258 to obtain the coordinates ($X_L$, $X_R$, $y_i$) of the left, middle and right point images by finding the brightest point of the image on the 1D image sensor. According to the inputted convergent point parameter signal ($\theta_L$, $\theta_R$, $\phi$, $\Omega$, S, f) 250 and the obtained parallax signal ($x_L$, $x_R$, $y_i$), the computing logic procedure 273 computes and outputs a convergent point coordinates signal ($X_V$, $Y_V$, $Z_V$) 290 and an object point coordinates signal ($X_P$, $Y_P$, $z_P$) 191, and calculate and output a set of new convergent point parameter signals ($\theta_L^{New}$, $\theta_R^{New}$, $\phi^{New}$, $\Omega^{New}$, $\Phi^{New}$, $S^{New}$) 253 to achieve the purpose of tracking the object point. Further, the computing logic procedure 273 calculates and outputs a set of new convergent point parameter signal ($\theta_L^{New}$, $\theta_M^{New}$, $\theta_R^{New}$, $\phi^{New}$, $\Omega^{New}$, $\Phi^{New}$, $S^{New}$) 253 according to the inputted new convergent point coordinates signal ($X_V^{New}$, $Y_V^{New}$, $Z_V^{New}$) 292 to output the signal compulsorily and reset the position of the convergent point to achieve the purpose of resetting the new convergent point.

In summation of the description above, the characteristics of the method in accordance with the present invention has been fully disclosed, and the invention improves over the prior art and complies with the requirements of patent application, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A method of recognizing and tracking a spatial point, comprising:

a point light source, formed by a movable active point light source, which is a scattered visible light or non-visible light emitted from a point light source, or formed by a movable passive point light source which is a pointed reflecting object for reflecting the light of other light sources; and a spatial point recognition device, for receiving the scattered light emitted by the point light source, and calculating and outputting a convergent point coordinates signal ($X_V$, $Y_V$, $Z_V$) of the spatial point recognition device, and an object point coordinates signal ($X_P$, $Y_P$, $Z_P$) of the point light source, and the spatial point recognition device being capable of moving the convergent point, such that the coordinates of the convergent point are superimposed with the coordinates of the object point, so as to achieve the purpose of tracking the point light source automatically, at the same the spatial point recognition device also receives the coordinates signal ($X_V^{New}$, $Y_V^{New}$, $Z_V^{New}$) of a new convergent point provided by other external devices to reset the position of the convergent point, so as to achieve the purpose of resetting the convergent point of the spatial point recognition device.

2. The method of recognizing and tracking a spatial point as recited in claim 1, wherein the spatial point recognition device, comprising:

a parallax imaging device, for outputting a set of convergent point parameter signals and a pair of left and right 2D image signals with a parallax signal after the light emitted by the point light source is received, as well as receiving a set of new convergent point parameter signals for changing the position of the convergent point of the parallax imaging device; and a spatial point computing device, for calculating and outputting the convergent point coordinates signal ($X_V$, $Y_V$, $Z_V$) of the parallax imaging device and the object point coordinates signal ($X_P$, $Y_P$, $Z_P$) of the point light source after the set of convergent point parameter signals and the pair of left and right 2D image signals with a parallax signal are received, as well as calculating and outputting a set of new convergent point parameter signals according to the object point coordinates signal ($X_P$, $Y_P$, $Z_P$) of the point light source, so as to superimpose the coordinates of the convergent point with the coordinates of the object point to achieve the purpose of tracking the point light source, and also receiving an new convergent point coordinates signal ($X_V^{New}$, $Y_V^{New}$, $Z_V^{New}$) Provided by other external device such that calculating and compulsorily outputting a set of new convergent point parameter signals according to the inputted new convergent point coordinates signal ($X_V^{New}$, $Y_V^{New}$, $Z_V^{New}$) to reset the position of the convergent point, so as to achieve the purpose of resetting the new convergent point.

3. The method of recognizing and tracking a spatial point as recited in claim 2, wherein the parallax imaging device, comprising:

a left camera, installed at a convergent point positioning mechanical device, for outputting a left 2D image signals with a parallax signal, after a scattered light emitted by the point light source is received;

a right camera, installed at the convergent point positioning mechanical device, for outputting a right 2D image signals with a parallax signal, after a scattered light emitted by the point light source is received;

a left 2D image memory and output device, for storing and outputting a left 2D image signals with a parallax signal after the left 2D image signals are read;

a right 2D image memory and output device, for storing and outputting a right 2D image signals with a parallax signal after the right 2D image signals are read;

a convergent point positioning mechanical device, formed by a plurality of rotating and displacing mechanical structures, actuators, and positioning sensors, for fixing, retaining, rotating and displacing the left and right cameras, such that a convergent point driving and controlling signal is received for driving and controlling all actuators to change and reset the direction of the visual axis of the left and right cameras, so as to achieve the purpose of changing and resetting the position of the convergent point of the parallax imaging device, and the data of all positioning sensors are outputted to provide the direction and position of the visual axis of the left and right cameras;

a convergent point reading device, for reading the data of all positioning sensors on the convergent point positioning mechanical device and the focal length of the cameras, and outputting a set of convergent point parameter signals; and a convergent point setting device, for receiving a set of new convergent point parameter signals and outputting a convergent point driving and controlling signal which is converted from the set of new convergent point parameter signals, so as to achieve the purpose of driving all actuators on the convergent point positioning mechanical device.

4. The method of recognizing and tracking a spatial point as recited in claim 3, wherein the left camera, comprising:

an optical filter, for filtering a light source with a wavelength other than the wavelength of the point light source;

an automatic fine-tuning 2D aperture, being a crevice in the shape of a circular hole, whose diameter can be fine-tuned automatically;

an automatic focusing 2D lens module, being a lens module with horizontal and vertical direction 2D focusing abilities for automatically focusing and outputting the focal length; and a 2D image sensor, formed by a general CCD or CMOS, for outputting a left 2D image signal with a parallax signal.

5. The method of recognizing and tracking a spatial point as recited in claim 3, wherein the right camera, comprising:

an optical filter, for filtering a light source with a wavelength other than the wavelength of the point light source;

an automatic fine-tuning 2D aperture, being a crevice in the shape of a circular hole, whose diameter can be fine-tuned automatically;

an automatic focusing 2D lens module, being a lens module with horizontal and vertical direction 2D focusing abilities for automatically focusing and outputting the focal length; and a 2D image sensor, formed by a general CCD or CMOS, for outputting a right 2D image signal with a parallax signal.

6. The method of recognizing and tracking a spatial point as recited in claim 2, wherein the spatial point computing device, comprising:
- an electronic interface, formed by plurality of general electronic components including digital I/O ports, ADCs and DACs to serve as an interface of connecting the parallax imaging device, for reading the set of convergent point parameter signals, and left and right 2D image signals with a parallax signal; as well as outputting a set of new convergent point parameter signals;
- an electronic interface, being a standard transmission interface formed by a general cable or wireless RS232, USB, network, to serve as an interface of connecting another external device, for reading a new convergent point coordinates signal $(X_V^{New}, Y_V^{New}, Z_V^{New})$, as well as outputting an object point coordinates signal $(X_P, Y_P, Z_P)$ of the point light source and a convergent point coordinates signal $(X_V, Y_V, Z_V)$ of the parallax imaging device; and
- a computing procedure device, being a general microcomputer formed by a microprocessor, a DSP, and a memory device, a computing logic procedure installed in the memory device is used for calculating and outputting a convergent point coordinates signal $(X_V, Y_V, Z_V)$ of the parallax imaging device and an object point coordinates signal $(X_P, Y_P, Z_P)$ of the point light source according to the inputted set of convergent point parameter signals and the parallax signals which are obtained from the inputted pair of left and right 2D image signals with a parallax signal, and calculating and outputting a set of new convergent point parameter signals according to the object point coordinates signal $(X_P, Y_P, Z_P)$ to superimpose the coordinates of the convergent point of the parallax imaging device with the coordinates of the object point of the point light source, so as to achieve the purpose of tracking the object point of the point light source, and the computing logic procedure also calculating and compulsorily outputting a set of new convergent point parameter signals according to the inputted new convergent point coordinates signal $(X_V^{New}, Y_V^{New}, Z_V^{New})$ to reset the position of the convergent point, so as to achieve the purpose of resetting the new convergent point.

7. The method of recognizing and tracking a spatial point as recited in claim 2, wherein the set of convergent point parameter signals are $(\theta_L, \theta_R, \phi_L, \phi_R, \Omega, \Phi, S, f)$, and the parallax signals are $(x_L, y_L, x_R, y_R)$, and the set of new convergent point parameter signals are $(\theta_L^{New}, \theta_R^{New}, \phi_L^{New}, \phi_R^{New}, \Omega^{New}, \Phi^{New}, S^{New})$.

8. The method of recognizing and tracking a spatial point as recited in claim 3, wherein a parallax signal included in the left 2D image signal is $(x_L, y_L)$, and a parallax signal included in the right 2D image signal is $(x_R, y_R)$.

9. The method of recognizing and tracking a spatial point as recited in claim 8, further comprising a relation $y_L = y_R = y_i$, existed between the parallax signals $(x_L, y_L)$ and $(x_R, y_R)$.

10. The method of recognizing and tracking a spatial point as recited in claim 7, wherein the set of convergent point parameter signals $(\theta_L, \theta_R, \phi_L, \phi_R \Omega, \Phi, S, f)$ has a relation of $\phi_L, \phi_R = \phi$, and the set of new convergent point parameter signals $(\theta_L^{New}, \theta_R^{New}, \phi_L^{New}, \phi_R^{New}, \Omega^{New}, \Phi^{New}, S^{New})$ has a relation of $\phi_L^{New} = \phi_R^{New} = \phi^{New}$.

11. The method of recognizing and tracking a spatial point as recited in claim 6, wherein the computing logic procedure of the computing procedure device processes the 2D image signals to find the brightest point on the 2D left and right images, and obtains coordinates of parallax signal $(x_L, y_L)$ and coordinates of parallax signal $(x_R, y_R)$ corresponding to the point light source.

12. The method of recognizing and tracking a spatial point as recited in claim 6, wherein the computing logic procedure of the computing procedure device bases on the vector of the left convergent point and the unit vector of the left visual axis, and the vector of the right convergent point and the unit vector of the right visual axis having a geometric relation of being parallel with each other, and the vector of the left convergent point and the vector of the right convergent point having a geometric relation of being intersected with each other at the convergent point to compute a convergent point coordinates signal $(X_V, Y_V, Z_V)$ according to the following equations:

$$X_V = \frac{\frac{R_{L23}}{R_{L13}}}{\frac{R_{L23}}{R_{L13}} - \frac{R_{R23}}{R_{R13}}} X''_{L0} - \frac{\frac{R_{R23}}{R_{R13}}}{\frac{R_{L23}}{R_{L13}} - \frac{R_{R23}}{R_{R13}}} X''_{R0} + \frac{Y''_{R0} - Y''_{L0}}{\frac{R_{L23}}{R_{L13}} - \frac{R_{R23}}{R_{R13}}}$$

$$Y_V = \frac{\frac{R_{L33}}{R_{L23}}}{\frac{R_{L33}}{R_{L23}} - \frac{R_{R33}}{R_{R23}}} Y''_{L0} - \frac{\frac{R_{R33}}{R_{R23}}}{\frac{R_{L33}}{R_{L23}} - \frac{R_{R33}}{R_{R23}}} Y''_{R0} + \frac{Z''_{R0} - Z''_{L0}}{\frac{R_{L33}}{R_{L23}} - \frac{R_{R33}}{R_{R23}}}$$

$$Z_V = \frac{\frac{R_{L13}}{R_{L33}}}{\frac{R_{L13}}{R_{L33}} - \frac{R_{R13}}{R_{R33}}} Z''_{L0} - \frac{\frac{R_{R13}}{R_{R33}}}{\frac{R_{L13}}{R_{L33}} - \frac{R_{R13}}{R_{R33}}} Z''_{R0} + \frac{X''_{R0} - X''_{L0}}{\frac{R_{L13}}{R_{L33}} - \frac{R_{R13}}{R_{R33}}}.$$

13. The method of recognizing and tracking a spatial point as recited in claim 6, wherein the computing logic procedure of the computing procedure device bases on the principle of geometric optical imaging which refers to the vector of the left point image and the vector of the left object point, and the vector of the right point image and the vector of the right object point having a geometric relation of being parallel with each other, and the vector of the left object point and the vector of the right object point having geometric relation of being intersected with each other at the object point to calculate an object point coordinates signal $(X_P, Y_P, Z_P)$ according to the following equations:

$$X_P = \frac{\frac{-R_{L21}x_L - R_{L22}y_i + fR_{L23}}{-R_{L11}x_L - R_{L12}y_i + fR_{L13}}(fR_{L13} + X''_{L0})}{\frac{-R_{L21}x_L - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}} -$$

$$\frac{\frac{-R_{R21}x_R - R_{R22}y_i + fR_{R23}}{-R_{R11}x_R - R_{R12}y_i + fR_{R13}}(fR_{R13} + X''_{R0})}{\frac{-R_{L21}x_L - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}} +$$

$$\frac{fR_{R23} + Y''_{R0} - (fR_{L23} + Y''_{L0})}{\frac{-R_{L21} - R_{L22}y_i + fR_{L23}}{-R_{L11}x_L - R_{L12}y_i + fR_{L13}} - \frac{-R_{R21}x_R - R_{R22}y_i + fR_{R23}}{-R_{R11}x_R - R_{R12}y_i + fR_{R13}}}$$

$$Y_P = \frac{\frac{-R_{L31}x_L - R_{L32}y_i + fR_{L33}}{-R_{L21}x_L - R_{L22}y_i + fR_{L23}}(fR_{L23} + Y''_{L0})}{\frac{-R_{L31}x_L - R_{L32}y_i + fR_{L33}}{-R_{L21}x_L - R_{L22}y_i + fR_{L23}} - \frac{-R_{R31}x_R - R_{R32}y_i + fR_{R33}}{-R_{R21}x_R - R_{R22}y_i + fR_{R23}}} -$$

-continued $$Z_P = \frac{\frac{-R_{R31}x_R - R_{R32}y_i + fR_{R33}}{-R_{R21}x_R - R_{R22}y_i + fR_{R23}}(fR_{R23} + Y''_{R0})}{\frac{-R_{L31}x_L - R_{L32}y_i + fR_{L33}}{-R_{L21}x_L - R_{L22}y_i + fR_{L23}} - \frac{-R_{R31}x_R - R_{R32}y_i + fR_{R33}}{-R_{R21}x_R - R_{R22}y_i + fR_{R23}}} +$$

$$\frac{(fR_{R33} + Z''_{R0}) - (fR_{L33} + Z''_{L0})}{\frac{-R_{L31}x_L - R_{L32}y_i + fR_{L33}}{-R_{L21}x_L - R_{L22}y_i + fR_{L23}} - \frac{-R_{R31}x_R - R_{R32}y_i + fR_{R33}}{-R_{R21}x_R - R_{R22}y_i + fR_{R23}}}$$

$$Z_P = \frac{\frac{-R_{L11}x_L - R_{L12}y_i + fR_{L13}}{-R_{L31}x_L - R_{L32}y_i + fR_{L33}}(fR_{L33} + Z''_{L0})}{\frac{-R_{L11}x_L - R_{L12}y_i + fR_{L13}}{-R_{L31}x_L - R_{L32}y_i + fR_{L33}} - \frac{-R_{R11}x_R - R_{R12}y_i + fR_{R13}}{-R_{R31}x_R - R_{R32}y_i + fR_{R33}}} -$$

$$\frac{\frac{-R_{R11}x_R - R_{R12}y_i + fR_{R13}}{-R_{R31}x_R - R_{R32}y_i + fR_{R33}}(fR_{R33} + Z''_{R0})}{\frac{-R_{L11}x_L - R_{L12}y_i + fR_{L13}}{-R_{L31}x_L - R_{L32}y_i + fR_{L33}} - \frac{-R_{R11}x_R - R_{R12}y_i + fR_{R13}}{-R_{R31}x_R - R_{R32}y_i + fR_{R33}}} +$$

$$\frac{fR_{R13} + X''_{R0} - (fR_{L13} + X''_{L0})}{\frac{-R_{L11}x_L - R_{L12}y_i + fR_{L13}}{-R_{L31}x_L - R_{L32}y_i + fR_{L33}} - \frac{-R_{R11}x_R - R_{R12}y_i + fR_{R13}}{-R_{R31}x_R - R_{R32}y_i + fR_{R33}}}$$

14. The method of recognizing and tracking a spatial point as recited in claim 10, wherein the positive and negative values of each angle with respect to the set of convergent point parameter signals ($\theta_L$, $\theta_R$, $\phi_L$, $\phi_R$, $\Omega$, $\Phi$, S, f), and the set of new convergent point parameter signals ($\theta_L^{New}$, $\theta_R^{New}$, $\phi_L^{New}$, $\phi_R^{New}$, $\Omega^{New}$, $\Phi^{New}$, $S^{New}$) are defined according to the right-hand rule or the left-hand rule.

15. The method of recognizing and tracking a spatial point as recited in claim 12, wherein the values of $R_{11}$~$R_{33}$ and $X''_{L0} Y''_{L0} Z''_{L0} X''_{R0} Y''_{R0} Z''_{R0}$ vary with the order of rotating the coordinates, and the values of $R_{11}$~$R_{33}$ and $X''_{L0} Y''_{L0} Z''_{L0} X''_{R0} Y''_{R0} Z''_{R0}$ in a result of one of the orders of rotating the coordinates are:

$R_{L11} = \cos\Theta\cos\theta_L - \sin\Theta\cos\Phi\sin\theta_L;$ $R_{L12} = \cos\Theta\sin\theta_L\sin\varphi + \sin\Theta\sin\Phi\cos\varphi + \sin\Theta\cos\Phi\cos\theta_L\sin\varphi;$ $R_{L13} = \cos\Theta\sin\theta_L\cos\varphi - \sin\Theta\sin\Phi\sin\varphi + \sin\Theta\cos\Phi\cos\theta_L\cos\varphi;$ $R_{L21} = \sin\Phi\sin\theta_L;$ $R_{L22} = \cos\Phi\cos\varphi - \sin\Phi\cos\theta_L\sin\varphi;$ $R_{L23} = -\cos\Phi\sin\varphi - \sin\Phi\cos\theta_L\cos\varphi;$ $R_{L31} = -\sin\Theta\cos\theta_L - \cos\Theta\cos\Phi\sin\theta_L;$ $R_{L32} = -\sin\Theta\sin\theta_L\sin\varphi + \cos\Theta\sin\Phi\cos\varphi + \cos\Theta\cos\Phi\cos\theta_L\sin\varphi;$ $R_{L33} = -\sin\Theta\sin\theta_L\cos\varphi - \cos\Theta\sin\Phi\sin\varphi + \cos\Theta\cos\Phi\cos\theta_L\cos\varphi;$ $R_{R11} = \cos\Theta\cos\theta_R - \sin\Theta\cos\Phi\sin\theta_R;$ $R_{R12} = \cos\Theta\sin\theta_R\sin\varphi + \sin\Theta\sin\Phi\cos\varphi + \sin\Theta\cos\Phi\cos\theta_R\sin\varphi;$ $R_{R13} = \cos\Theta\sin\theta_R\cos\varphi - \sin\Theta\sin\Phi\sin\varphi + \sin\Theta\cos\Phi\cos\theta_R\cos\varphi;$ $R_{R21} = \sin\Phi\sin\theta_R;$ $R_{R22} = \cos\Phi\cos\varphi - \sin\Phi\cos\theta_R\sin\varphi;$ $R_{R23} = -\cos\Phi\sin\varphi - \sin\Phi\cos\theta_R\cos\varphi;$ $R_{R31} = -\sin\Theta\cos\theta_R - \cos\Theta\cos\Phi\sin\theta_R;$ $R_{R32} = -\sin\Theta\sin\theta_R\sin\varphi + \cos\Theta\sin\Phi\cos\varphi + \cos\Theta\cos\Phi\cos\theta_R\sin\varphi;$ $R_{R33} = -\sin\Theta\sin\theta_R\cos\varphi - \cos\Theta\sin\Phi\sin\varphi + \cos\Theta\cos\Phi\cos\theta_R\cos\varphi;$ $X''_{L0} = H\sin\Phi\sin\Theta + \frac{S}{2}\cos\Theta;$ $Y''_{L0} = H\cos\Theta;$ $Z''_{L0} = H\sin\Phi\cos\Theta - \frac{S}{2}\sin\Theta;$ $X''_{R0} = H\sin\Theta\sin\Phi - \frac{S}{2}\cos\Theta;$ $Y''_{R0} = H\cos\Theta;$ and $Z''_{R0} = H\cos\Theta\sin\Phi + \frac{S}{2}\sin\Theta$

16. The method of recognizing and tracking a spatial point as recited in claim 6, wherein the object point tracking made by the computing logic procedure of the computing procedure device is divided into a small-angle object point tracking and a large-angle object point tracking according to the size of the object point tracking range.

17. The method of recognizing and tracking a spatial point as recited in claim 16, wherein the small-angle object point tracking controls the convergent point positioning mechanical device to change the value of ($\theta_L$, $\theta_R$, $\phi_L$, $\phi_R$) in order to change the convergent point and moves the convergent point to the position of the object point when the point light source (which is the object point) is closer to the convergent point, and the large-angle object point tracking controls the convergent point positioning mechanical device to change the value of ($\theta_L$, $\theta_R$, $\phi_L$, $\phi_R$, $\Theta$, $\Phi$, S) in order to change the convergent point and moves the convergent point to the position of the object point when the point light source (which is the object point) is farther away from the convergent point, so as to achieve the purpose of tracking the object point.

18. The method of recognizing and tracking a spatial point as recited in claim 17, wherein the small-angle object point tracking determines the change $\Delta\theta_L$, $\Delta\theta_R$, $\Delta\phi_L$, $\Delta\phi_R$ of the angles ($\theta_L$, $\theta_R$, $\phi_L$, $\phi_R$) according to a relative relation of the positions of the object point coordinates P($X_P$, $Y_P$, $Z_P$) and the convergent point coordinates V($X_V$, $Y_V$, $Z_V$) to change the values of ($\theta_L$, $\theta_R$, $\phi_L$, $\phi_R$), so as to achieve the purpose of superimposing the convergent point coordinates with the object point coordinates, and its calculation can be divided into a change of the convergent point along the vertical direction and a change of the convergent point along the horizontal direction as follows:

the change of the convergent point along the vertical direction is calculated by: $\Delta\phi = \cos^{-1}(\hat{u}_{LZ}^{new}\hat{u}'''_{LY}) - \pi/2$ when $\Delta\phi_L = \Delta\phi_R = \Delta\phi$;

(1) Tracking the convergent point upward: If $Z_P > Z_V$, then $\Delta\phi < 0$;

(2) Tracking the convergent point downward: If $Z_P < Z_V$, then $\Delta\phi > 0$; wherein $$\hat{u}_{LZ}^{new} = \frac{\overrightarrow{O'_L P}}{\|\overrightarrow{O'_L P}\|}$$

being a unit vector in the direction of $\overrightarrow{O''_L P}$;

$$\hat{u}_{RZ}^{new} = \frac{\overrightarrow{O'_R P}}{\|\overrightarrow{O'_R P}\|}$$

being a unit vector in the direction of $\overrightarrow{O''_R P}$;

the change of the convergent point along the horizontal direction is calculated as follow:

$$\Delta\theta_L = \cos^{-1}\frac{(\hat{u}_{LZ}^{new}|_P)g\hat{u}_{LZ}''}{\sqrt{(\hat{u}_{LZ}^{new}|_P)g(\hat{u}_{LZ}^{new}|_P)}};$$

$$\Delta\theta_R = \cos^{-1}\frac{(\hat{u}_{RZ}^{new}|_P)g\hat{u}_{RZ}''}{\sqrt{(\hat{u}_{RZ}^{new}|_P)g(\hat{u}_{RZ}^{new}|_P)}}$$

wherein, $\hat{u}_{LZ}^{new}|=\hat{u}_{LZ}^{new}-(\hat{u}_{LZ}^{new}\hat{u}''''_{LY})\hat{u}''''_{LY}$;

$\hat{u}_{RZ}^{new}|=\hat{u}_{RZ}^{new}-(\hat{u}_{RZ}^{new}\hat{u}''''_{RY})\hat{u}''''_{RY}$;

(1) The convergent point tracking an object point on the right side: If $\overline{O''_L V}\times\overline{O''_L P}\hat{u}''''_{LY}<0$ and $\overline{O''_R V}\times\overline{O''_R P}\hat{u}''''_{RY}<0$, then the object point $P(X_P, Y_P, Z_P)$ is disposed on the right side of the convergent point $V(X_V, Y_V, Z_V)$, such that $\Delta\theta_L<0$ and $\Delta\theta_R<0$;

(2) The convergent point tracking an object point on the left side: If $\overline{O''_L V}\times\overline{O''_L P}\hat{u}''''_{LY}>0$ and $\overline{O''_R V}\times\overline{O''_R P}\hat{u}''''_{RY}>0$, then the object point $P(X_P, Y_P, Z_P)$ is disposed on the left side of the convergent point $V(X_V, Y_V, Z_V)$, such that $\Delta\theta_L>0$ and $\Delta\theta_R>0$;

(3) The convergent point tracking an object point towards a closer end: If $\overline{O''_L V}\times\overline{O''_L P}\hat{u}''''_{LY}<0$ and $\overline{O''_R V}\times\overline{O''_R P}\hat{u}''''_{RY}>0$, then the object point $P(X_P, Y_P, Z_P)$ is disposed in front of the convergent point $V(X_V, Y_V, Z_V)$ such that $\Delta\theta_L<0$ and $\Delta\theta_R>0$; and (4) The convergent point tracking an object point towards a farther end: If $\overline{O''_L V}\times\overline{O''_L P}\hat{u}''''_{LY}>0$ and $\overline{O''_R V}\times\overline{O''_R P}\hat{u}''''_{RY}<0$, then the object point $P(X_P, Y_P, Z_P)$ is disposed behind the convergent point $V(X_V, Y_V, Z_V)$, such that $\Delta\theta_L>0$ and $\Delta\theta_R<0$.

19. The method of recognizing and tracking a spatial point as recited in claim 17, wherein the large-angle object point tracking calculates and outputs a set of new convergent point parameter signal ($\theta_L^{New}, \theta_R^{New}, \phi_L^{New}, \phi_R^{New}, \Omega^{New}, \Phi^{New}, S^{New}$) according to the position of the object point $P(X_P, Y_P, Z_P)$ by a method of aligning the direction of the new central visual axis $\overline{O''_H P}$ with the object point under a condition of $\overline{O''_H P}\perp\hat{j}''_N$, in other words, after the neck parameter ($\Theta^{New}, \Phi^{New}$) being determined properly, and then using the relations of $\theta_L^{New}=-\theta^{New}, \theta_R^{New}=\theta^{New}, \phi_L^{New}=\phi_R^{New}=0$ to rotate and set the angle of the visual axis of the left and right cameras, so as to achieve the purpose of tracking the object point, and each related angle is calculated by:

$$\Theta^{New} = \tan^{-1}\left(\frac{X_P}{Z_P}\right)$$

$$X_P \sin\Theta^{New}\sin\Phi^{New} + Y_P\cos\Phi^{New} + Z_P\cos\Theta^{New}\sin\Phi^{New} = H; \text{ and}$$

$$\theta^{New} = \frac{1}{2}\sin^{-1}\left(\frac{\overrightarrow{O_L P}\times\overrightarrow{O_R P}}{\|\overrightarrow{O_L P}\|\|\overrightarrow{O_R P}\|}\right).$$

20. The method of recognizing and tracking a spatial point as recited in claim 6, wherein the new convergent point is reset according to the inputted new convergent point coordinates signal ($X_V^{New}, Y_V^{New}, Z_V^{New}$) to calculate and output a set of new convergent point parameter signals ($\theta_L^{New}, \theta_R^{New}, \phi_L^{New}, \phi_R^{New}, \Omega^{New}, \Phi^{New}, S^{New}$), and its calculation method is the same as the calculation method as recited in claim 19, but the value ($X_V^{New}, Y_V^{New}, Z_V^{New}$) is substituted into ($X_P, Y_P, Z_P$) in the equations.

* * * * *